United States Patent
Suzuki et al.

(10) Patent No.: US 9,791,997 B2
(45) Date of Patent: Oct. 17, 2017

(54) INFORMATION PROCESSING APPARATUS, SYSTEM, INFORMATION PROCESSING METHOD, AND PROGRAM

(71) Applicant: SONY CORPORATION, Tokyo (JP)

(72) Inventors: Satoshi Suzuki, Tokyo (JP); Fumihiko Tanuma, Tokyo (JP)

(73) Assignee: SONY CORPORATION, Tokyo (JP)

( * ) Notice: Subject to any disclaimer, the term of this patent is extended or adjusted under 35 U.S.C. 154(b) by 245 days.

(21) Appl. No.: 14/619,431

(22) Filed: Feb. 11, 2015

(65) Prior Publication Data

US 2015/0242090 A1 Aug. 27, 2015

(30) Foreign Application Priority Data

Feb. 21, 2014 (JP) ................................. 2014-031607

(51) Int. Cl.
  G06F 3/048 (2013.01)
  G06F 3/0481 (2013.01)
  G06F 3/0484 (2013.01)

(52) U.S. Cl.
  CPC ...... G06F 3/04817 (2013.01); G06F 3/04842 (2013.01)

(58) Field of Classification Search
  CPC combination set(s) only.
  See application file for complete search history.

(56) References Cited

U.S. PATENT DOCUMENTS

| | | | | |
|---|---|---|---|---|
| 6,147,683 A | * | 11/2000 | Martinez | G06F 3/04855 715/786 |
| 2005/0091596 A1 | * | 4/2005 | Anthony | G06F 3/04815 715/712 |
| 2005/0138570 A1 | * | 6/2005 | Good | G06F 3/0481 715/789 |
| 2008/0240560 A1 | * | 10/2008 | Hibino | G06F 17/30551 382/168 |
| 2010/0002013 A1 | * | 1/2010 | Kagaya | G06F 3/0231 345/619 |
| 2010/0174993 A1 | * | 7/2010 | Pennington | G06F 1/1616 715/738 |
| 2011/0316888 A1 | * | 12/2011 | Sachs | G06F 1/1626 345/667 |
| 2012/0036466 A1 | * | 2/2012 | Venon | G06F 3/0482 715/772 |
| 2014/0109012 A1 | * | 4/2014 | Choudhary | G06F 3/0483 715/838 |

FOREIGN PATENT DOCUMENTS

JP 2003-143512 A 5/2003

* cited by examiner

*Primary Examiner* — Hien Duong
(74) *Attorney, Agent, or Firm* — Chip Law Group

(57) ABSTRACT

There is provided an information processing apparatus including a processor configured to perform the functions of displaying a cursor configured to select a range of a list screen on which a plurality of icons are arranged, and changing an icon or icons to be selected using the cursor based on an operation of a user while keeping unchanged the number of icons selectable using the cursor.

14 Claims, 18 Drawing Sheets

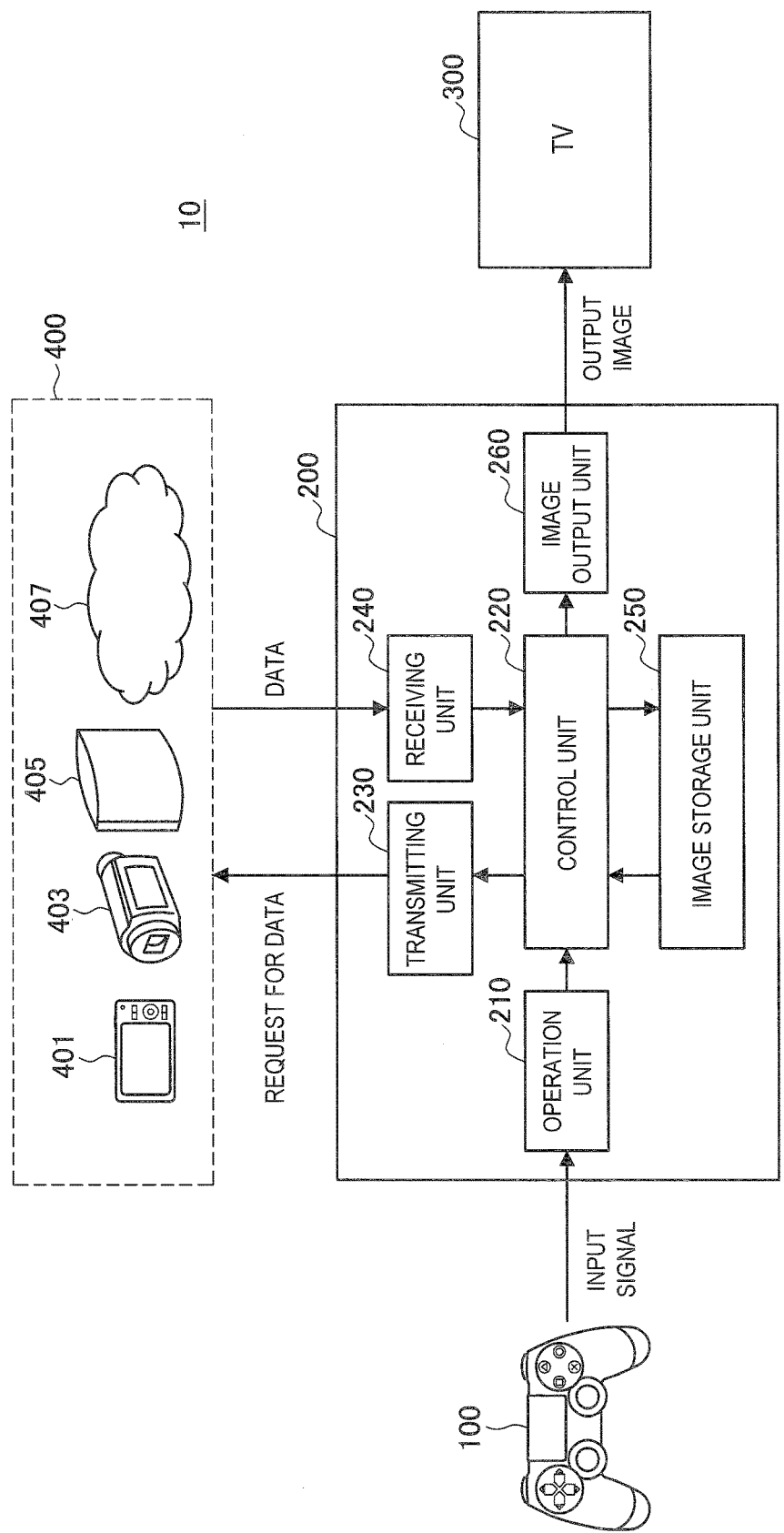

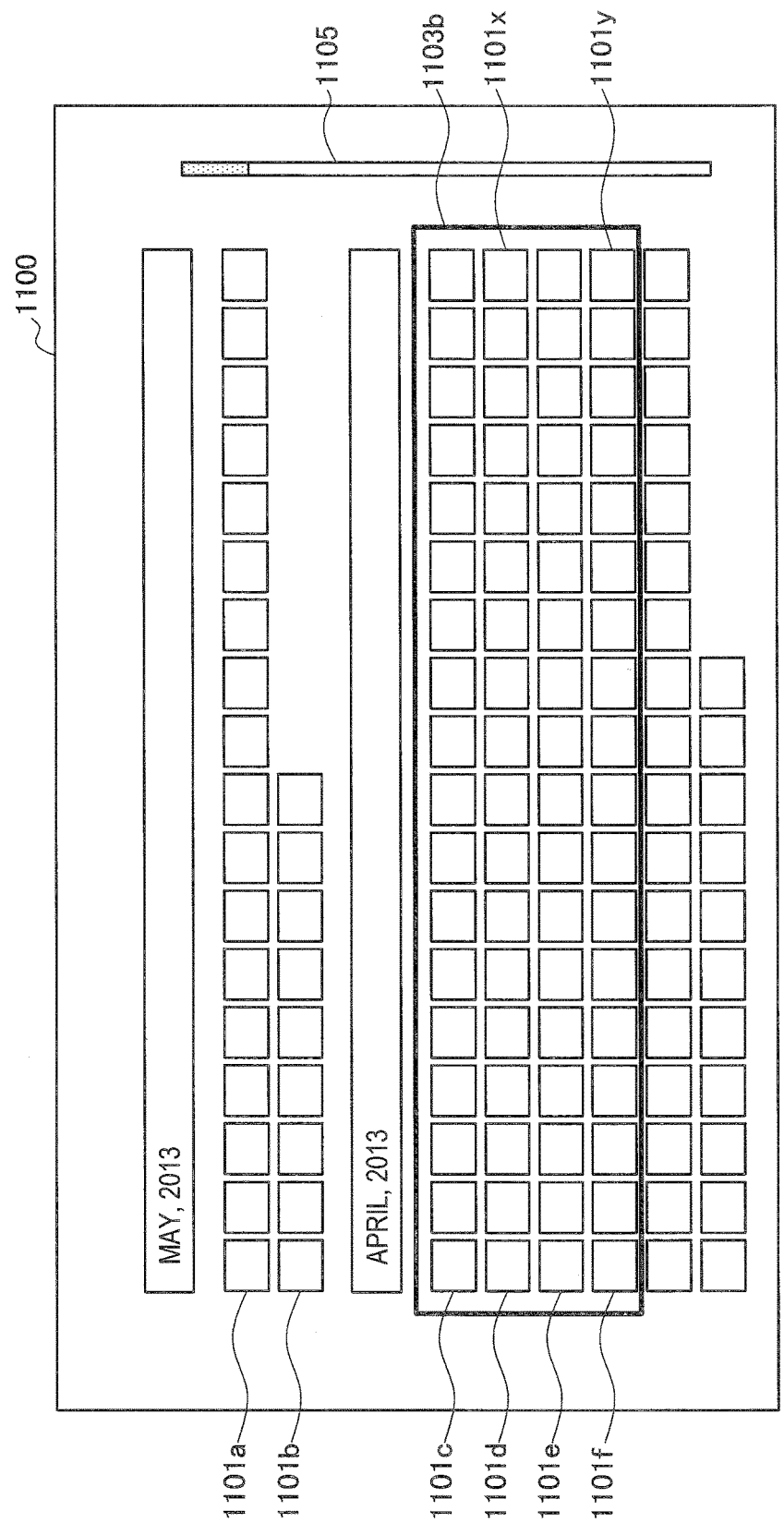

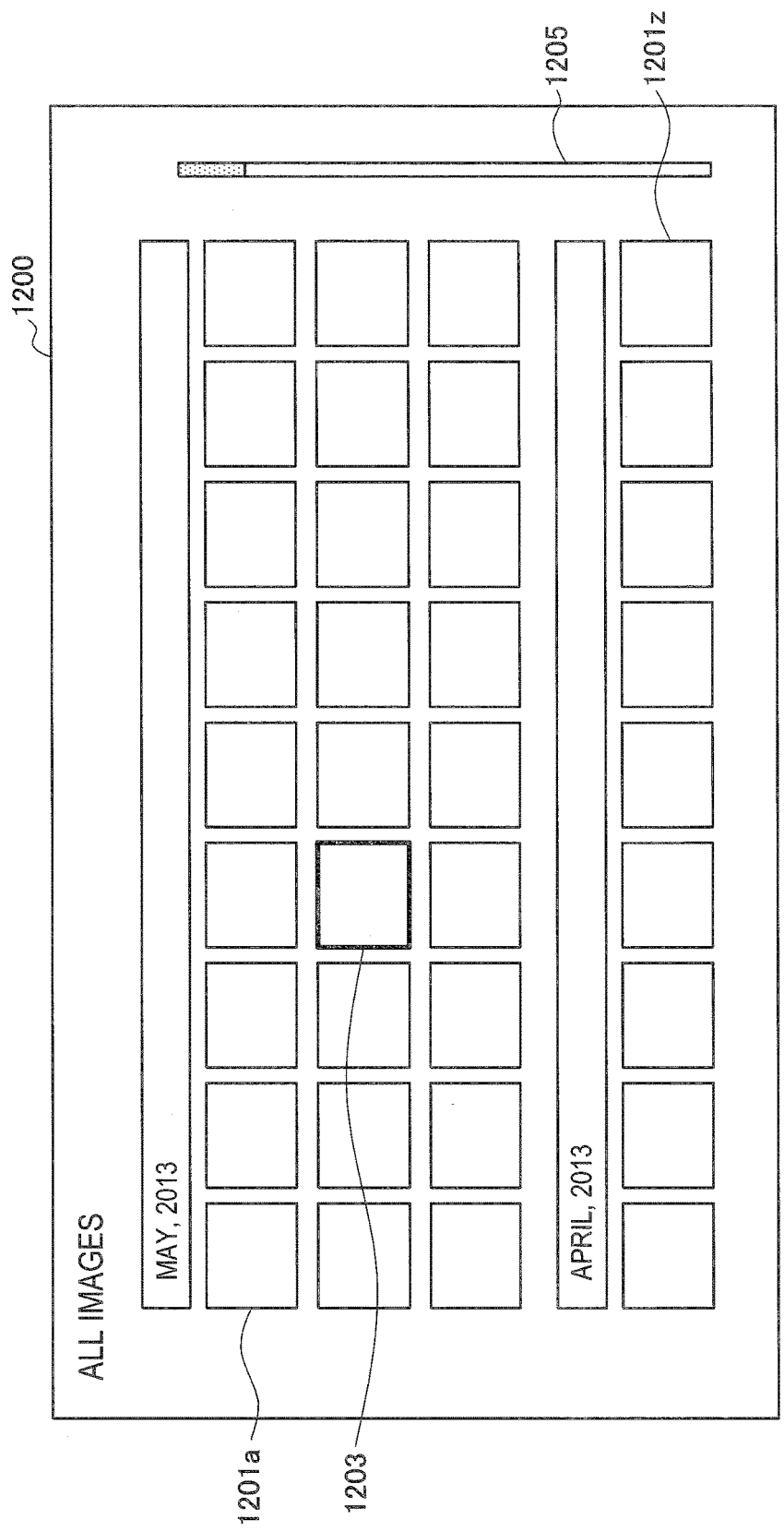

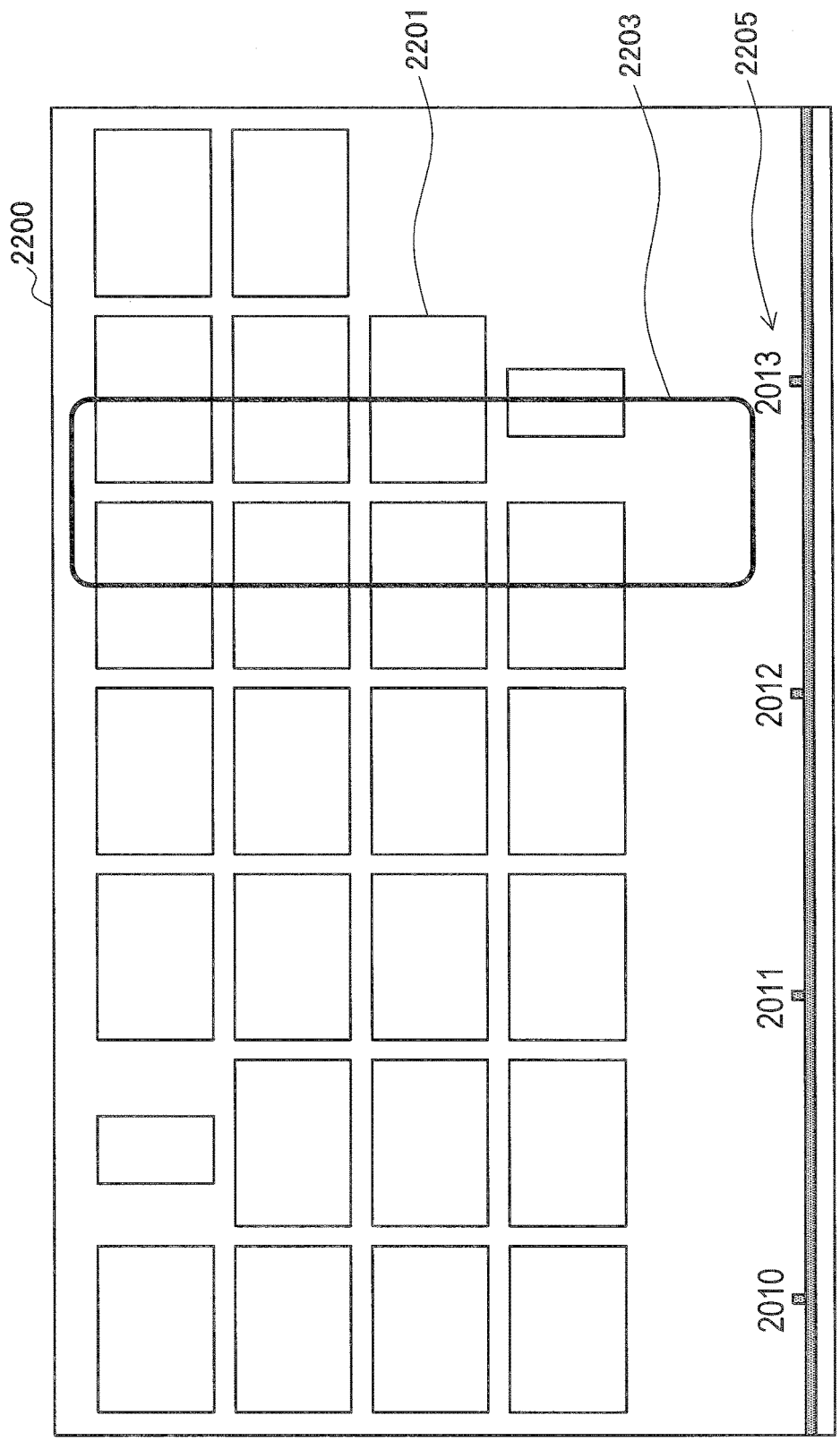

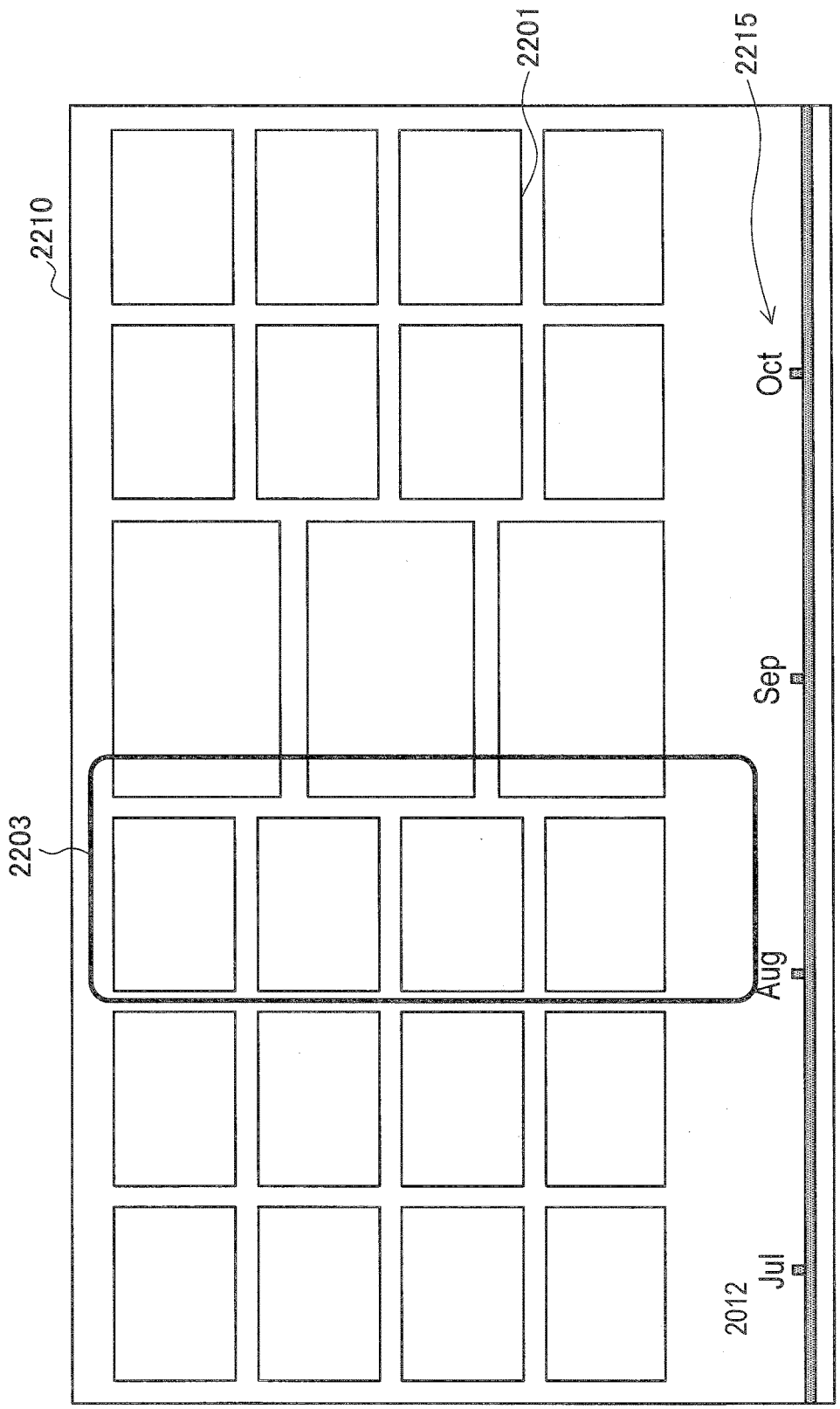

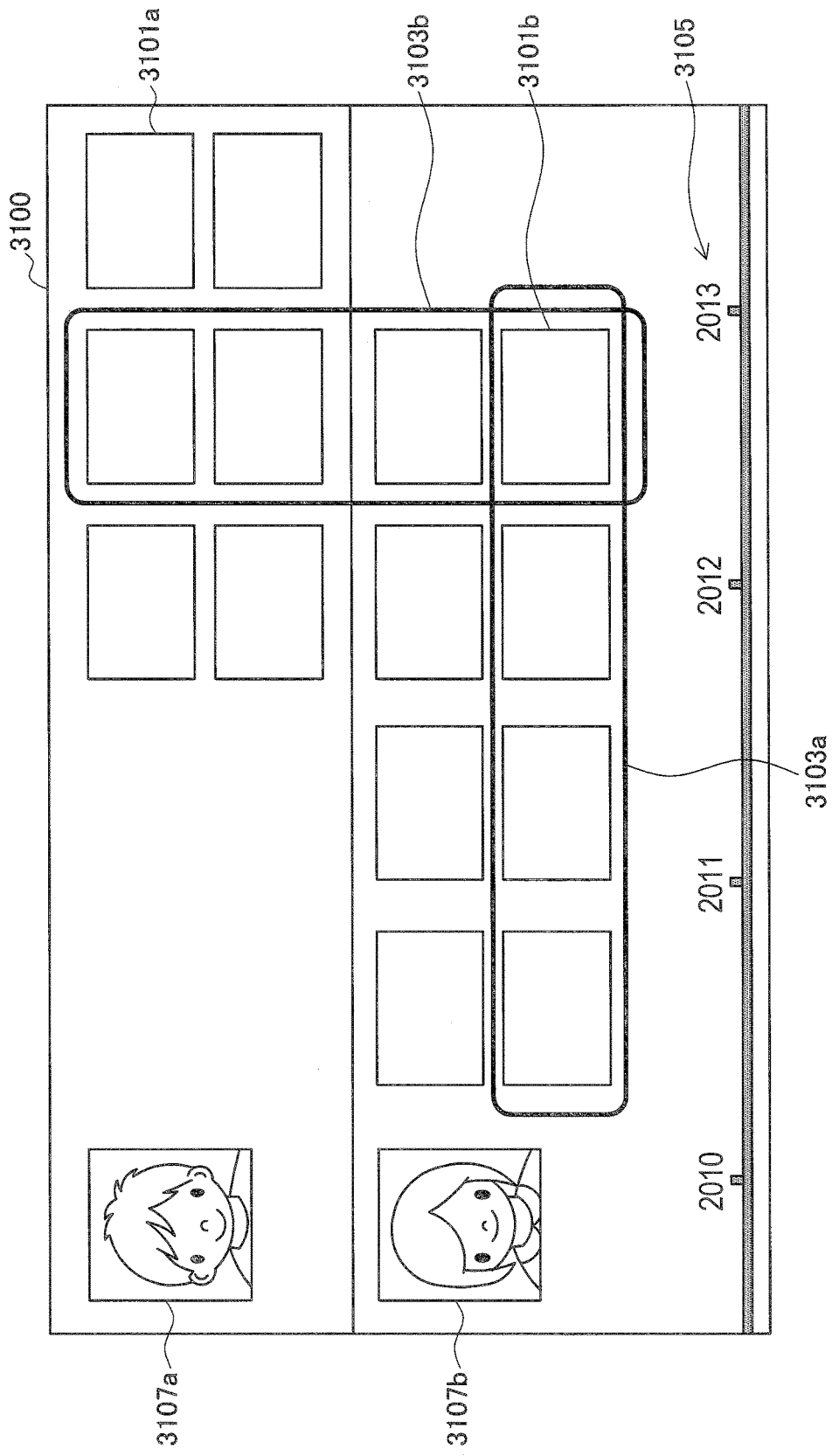

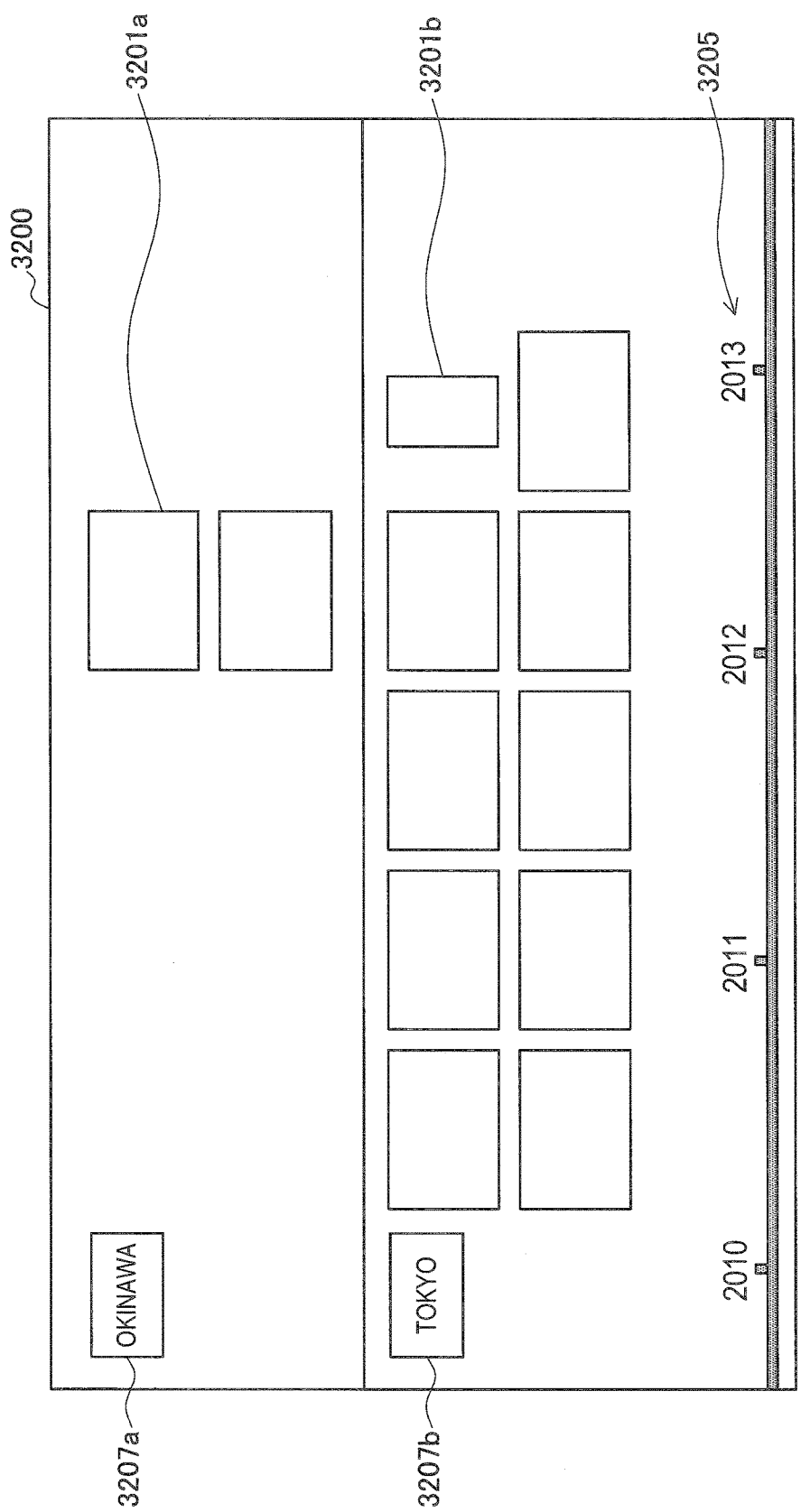

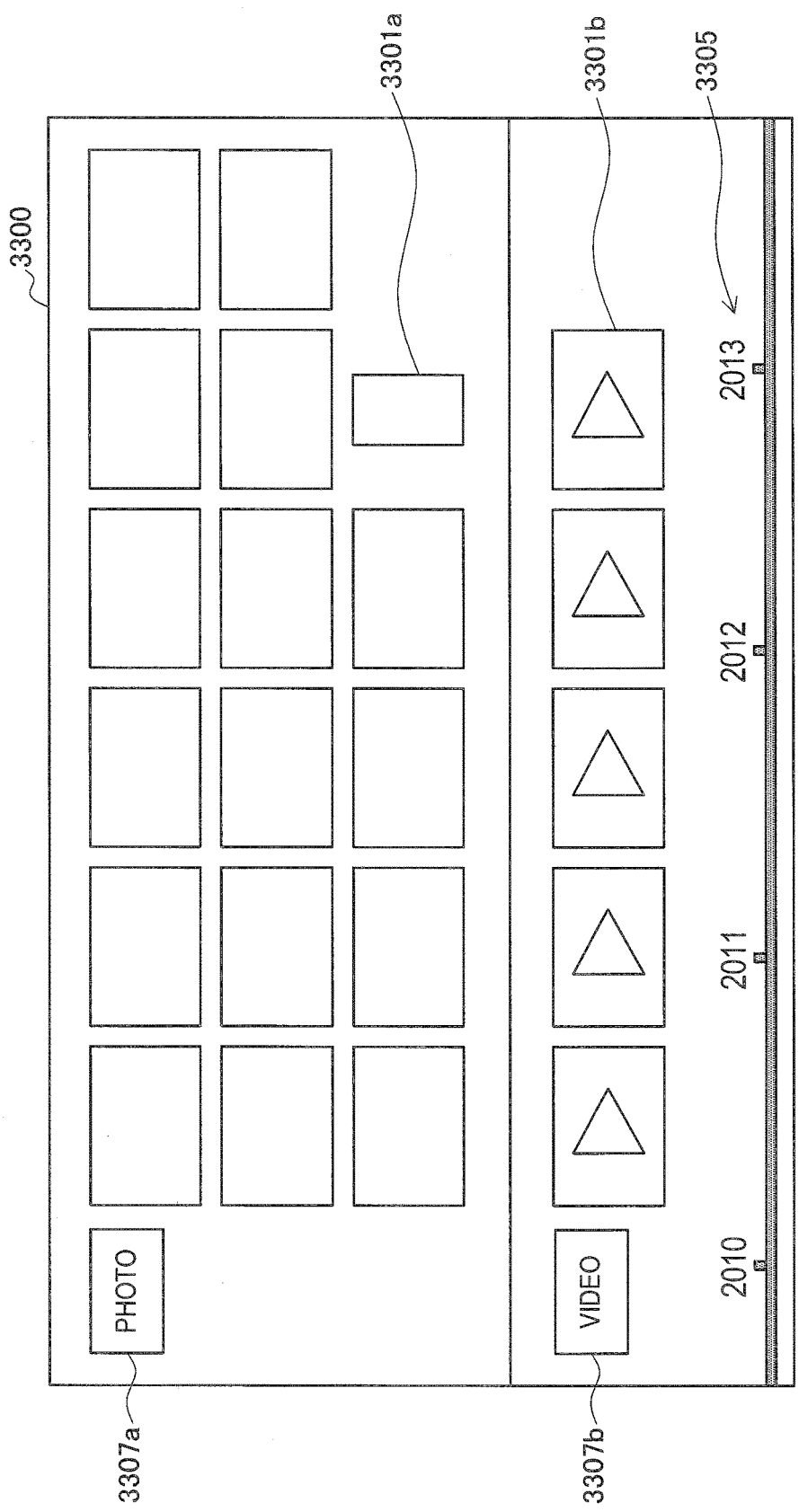

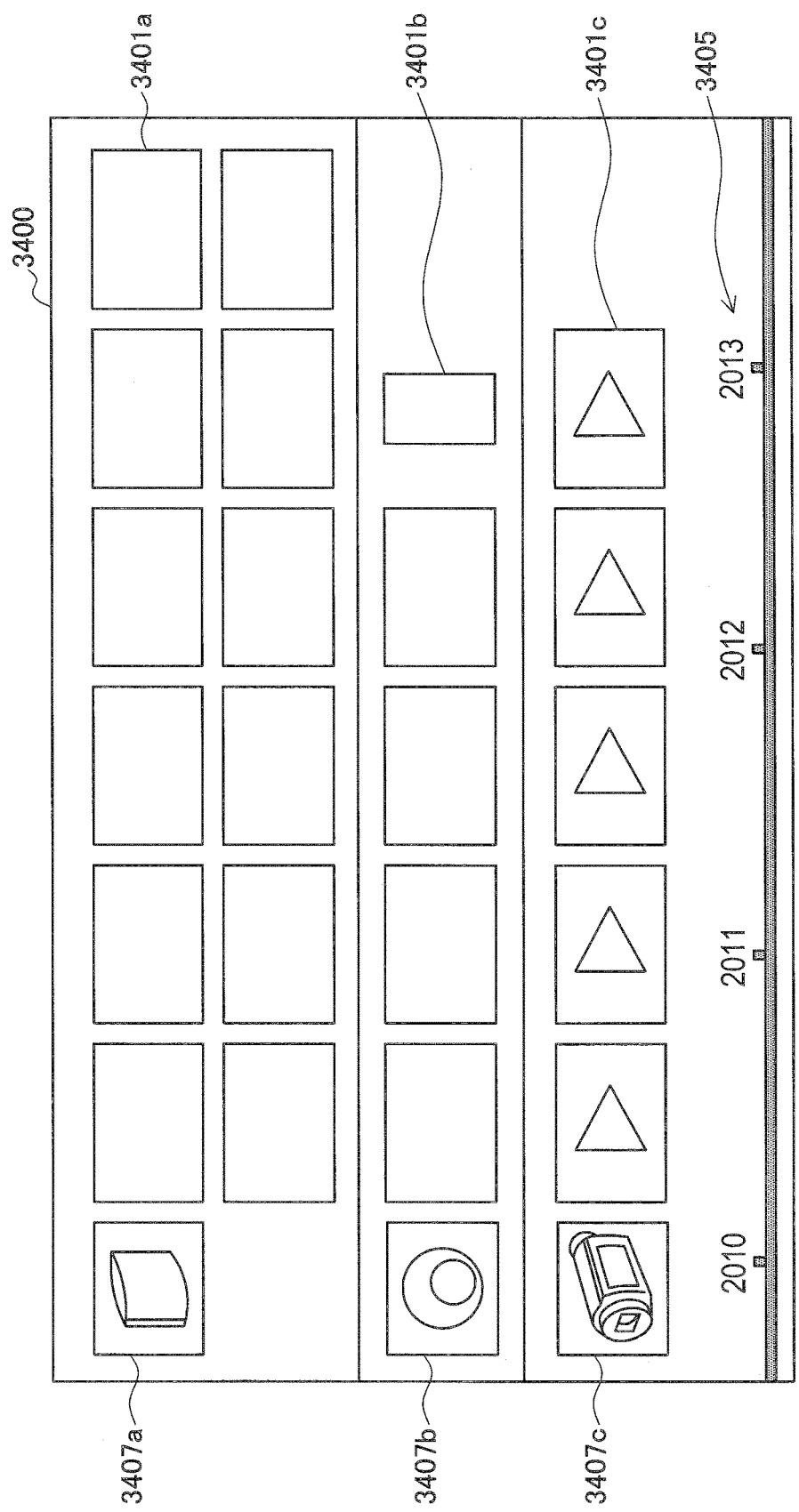

INFORMATION PROCESSING APPARATUS, SYSTEM, INFORMATION PROCESSING METHOD, AND PROGRAM

CROSS REFERENCE TO RELATED APPLICATIONS

This application claims the benefit of Japanese Priority Patent Application JP 2014-031607 filed Feb. 21, 2014, the entire contents of which are incorporated herein by reference.

BACKGROUND

The present disclosure relates to information processing apparatuses, systems, information processing methods, and programs.

Graphical user interfaces (GUIs) which allow users to perform operations, etc., on pieces of content using icons arranged on the screen, have been widely used as a technique of operating an information processing apparatus. For example, JP 2003-143512A describes a technique of selecting a desired image corresponding to a thumbnail image quickly and by a simple operation. More specifically, an operation unit obtains an instruction to move a cursor indicating selection of a thumbnail image forward or backward based on a key operation. When the length of a period of time for which the inputting of the instruction to move the cursor forward or backward has continued is less than one second, a microcomputer causes the cursor to move to the next or previous thumbnail image. When the length of a period of time for which the inputting of the instruction to move the cursor forward or backward has continued is no less than one second, the microcomputer causes the cursor to move to the next or previous page containing a predetermined number of thumbnail images.

SUMMARY

However, for example, in the technique described in JP 2003-143512A above, only one icon is selected at a time using the cursor. For example, when a large number of thumbnail images are displayed on the screen, each thumbnail image has a small size. In this case, when only one icon has been selected using the cursor, it is not easy to recognize where the icon currently selected using the cursor is located. The widespread use of digital cameras in various terminal devices has increased the number of pieces of content, such as images, etc., which are dealt with by users. Under such circumstances, the above-mentioned technique may not provide sufficient usability, particularly in selecting an icon on a list screen on which a large number of icons are arranged.

Therefore, the present disclosure proposes a novel and improved information processing apparatus, system, information processing method, and program which can provide improved usability in selecting an icon on a list screen on which a large number of icons are arranged.

According to an embodiment of the present disclosure, there is provided an information processing apparatus including a processor configured to perform the functions of displaying a cursor configured to select a range of a list screen on which a plurality of icons are arranged, and changing an icon or icons to be selected using the cursor based on an operation of a user while keeping unchanged the number of icons selectable using the cursor.

Further, according to an embodiment of the present disclosure, there is provided a system including one or more information processing apparatuses configured to perform the functions of displaying a cursor configured to select a range of a list screen on which a plurality of icons are arranged, and changing an icon or icons to be selected using the cursor based on an operation of a user while keeping unchanged the number of icons selectable using the cursor.

Further, according to an embodiment of the present disclosure, there is provided an information processing method including displaying a cursor configured to select a range of a list screen on which a plurality of icons are arranged, and changing an icon or icons to be selected using the cursor based on an operation of a user while keeping unchanged the number of icons selectable using the cursor.

Further, according to an embodiment of the present disclosure, there is provided a program for causing a computer to execute the functions of displaying a cursor configured to select a range of a list screen on which a plurality of icons are arranged, and changing an icon or icons to be selected using the cursor based on an operation of a user while keeping unchanged the number of icons selectable using the cursor.

As described above, according to the present disclosure, improved usability can be provided in selecting an icon on a list screen on which a large number of icons are arranged.

Note that the above advantages are not necessarily limiting. In addition to or instead of the above advantages, any advantages described in the present specification or other advantages arising from the present specification may be achieved.

BRIEF DESCRIPTION OF THE DRAWINGS

FIG. 1 is a diagram schematically showing a system according to an embodiment of the present disclosure;

FIG. 2B is a diagram showing an example of the first content list screen according to an embodiment of the present disclosure;

FIG. 3 is a diagram showing an example of a second content list screen according to an embodiment of the present disclosure;

FIG. 7A is a diagram showing an example list screen on which the range of pieces of content to be extracted can be changed in an embodiment of the present disclosure;

FIG. 7B is a diagram showing an example list screen on which the range of pieces of content to be extracted can be changed in an embodiment of the present disclosure;

FIG. 8 is a diagram showing a first example content category display in an embodiment of the present disclosure;

FIG. 9 is a diagram showing a second example content category display in an embodiment of the present disclosure;

FIG. 10 is a diagram showing a third example content category display in an embodiment of the present disclosure;

FIG. 11 is a diagram showing a fourth example content category display in an embodiment of the present disclosure;

DETAILED DESCRIPTION OF THE EMBODIMENT(S)

Figure 2A:
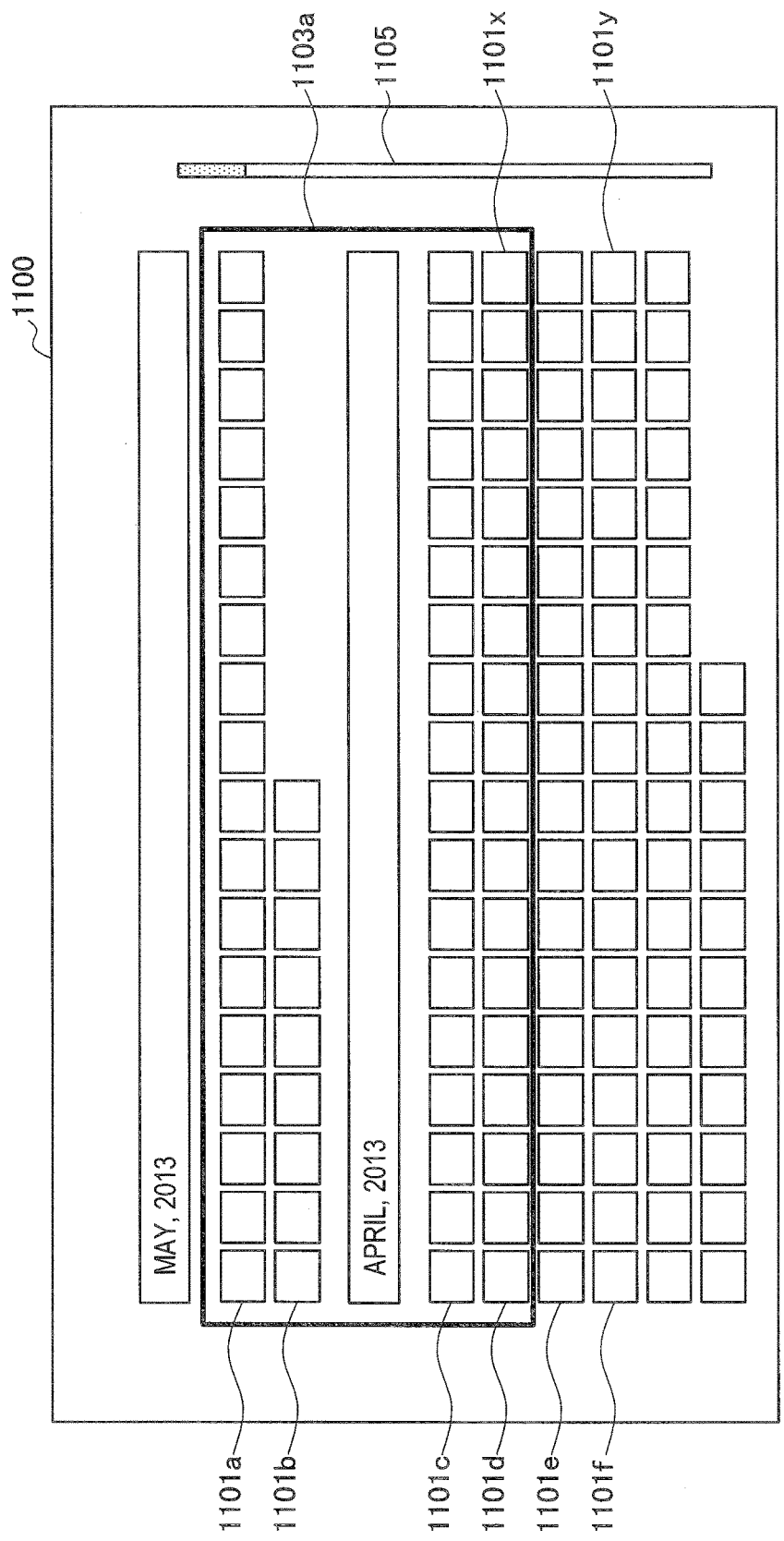
FIG. 2A is a diagram showing an example of a first content list screen according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. Configuration of System
2. Content List Screen
3. Operation Using Controller
4. Changing of Selection Range of Cursor
5. Extraction of Pieces of Content
6. Display of Content Categories
7. Hardware Configuration
8. Supplements (1. Configuration of System)

FIG. 1 is a diagram schematically showing a system according to an embodiment of the present disclosure. Referring to FIG. 1, the system 10 includes a controller 100, a game apparatus base unit 200, a television 300, and an external storage 400. Note that the controller 100 will be described in detail below.

The game apparatus base unit 200 includes an operation unit 210, a control unit 220, a transmitting unit 230, a receiving unit 240, an image storage unit 250, and an image output unit 260. The operation unit 210 is, for example, implemented by a port or communication interface to which the controller 100 is connected. Similarly, the image output unit 260 is implemented by a port or communication interface (e.g., an HDMI (registered trademark) port) to which the television 300 is connected. The transmitting unit 230 and the receiving unit 240 are implemented by a communication interface for communicating with the external storage 400 through a universal serial bus (USB), a local area network (LAN), the Internet, etc. The control unit 220 is implemented by a processor included in the game apparatus base unit 200 being operated according to a program stored in a memory. The image storage unit 250 may be implemented by a storage included in the game apparatus base unit 200.

Examples of the external storage 400 include external apparatuses which are connected to the game apparatus base unit 200 through a USB, such as a digital still camera 401 or a camcorder 403, a network attached storage (NAS) 405, an online storage 407, etc. In the game apparatus base unit 200, the transmitting unit 230 requests content data, such as an image, etc., from the external storage 400, and the receiving unit 240 receives content data which the external storage 400 transmits in response to a request.

In the system 10 thus configured, the game apparatus base unit 200 has, as one of the functions, the function of outputting content, such as an image, etc., obtained from the external storage 400 or the internal image storage unit 250 to the television 300 so that the content is played back. The number of pieces of content may be huge, and therefore, for example, the control unit 220 provides a list screen which displays a list of pieces of content using icons, such as thumbnails, etc., and a screen on which individual pieces of content are played back. Image data for displaying the list screen and the playback screen is generated by the control unit 220 and is then transmitted from the image output unit 260 to the television 300. The control unit 220 performs selection and playback of pieces of content, transition between the list screen and the playback screen, etc., based on the user's operation obtained from the controller 100 through the operation unit 210.

(2. Content List Screen)

FIGS. 2A and 2B are diagrams showing an example first content list screen according to an embodiment of the present disclosure. Referring to FIGS. 2A and 2B, the first content list screen 1100 displays content icons 1101, a cursor 1103, and a scrollbar 1105. The content list screen 1100 is, for example, displayed on the television 300 under the control of the control unit 220 of the game apparatus base unit 200. The elements of the screen will now be described in greater detail.

The content icons 1101 each indicate content. More specifically, for example, the content icons 1101 may each be a thumbnail which indicates an image content (a photograph, video, etc.), or an icon which indicates a song or document content. The cursor 1103 is used to select a range of the content list screen 1100 on which a plurality of content icons 1101 are arranged. The scrollbar 1105 indicates how much the content list screen 1100 has been scrolled.

For example, content icons 1101 selected using the cursor 1103 can be changed according to the user's operation which is performed using a direction key described below. For example, in FIG. 2A, content icons 1101 contained in rows which start with the content icons 1101a-1101d have been selected using the cursor 1103a. On the other hand, in FIG. 2B, for example, by performing a downward operation, the cursor 1103 has been changed to the cursor 1103b by which content icons 1101 contained in rows which start with the content icons 1101c-1101f have been selected.

In this case, even when content icons 1101 selected using the cursor 1103 are changed, the number of icons which can be selected using the cursor 1103 is kept unchanged (four rows in the shown example). Although, in the shown example, content icons 1101 which are selected are changed by shifting the cursor 1103 in the content list screen 1100, the location of the cursor 1103 may be fixed, and content icons 1101 which are selected may be changed by scrolling content icons 1101, in other examples.

FIG. 3 is a diagram showing an example second content list screen according to an embodiment of the present disclosure. Referring to FIG. 3, the second content list screen 1200 displays content icons 1201, a cursor 1203, and a scrollbar 1205. As with the first content list screen 1100, the second content list screen 1200 is displayed on the television 300 under the control of the control unit 220 of the game apparatus base unit 200. More specifically, the second content list screen 1200 is displayed according to a predetermined operation which is performed by the user on the first content list screen 1100. The elements of the screen will now be described in greater detail.

The content icons 1201 each indicate content. As with the content icons 1101 on the first content list screen 1100, the content icons 1201 may each be a thumbnail which indicates an image content (a photograph, video, etc.), or an icon which indicates a song or document content. The cursor 1203 is used to select one of the content icons 1201 arranged on the content list screen 1200. The scrollbar 1205 indicates how much the content list screen 1200 has been scrolled.

In the shown example, the content icons 1201 displayed on the second content list screen 1200 have a larger size than the sizes of the content icons 1101 on the first content list screen 1100. Therefore, the number of content icons 1201 which can be displayed on the second content list screen 1200 is smaller than the number of content icons 1101 displayed on the first content list screen 1100.

Moreover, here, the number of content icons 1101 which can be selected using the cursor 1103 on the first content list screen 1100 (the number of content icons 1101$a$-1101$x$ shown in FIG. 2A or the number of content icons 1101$c$-1101$y$ shown in FIG. 2B) corresponds to the number of content icons 1201 which can be displayed on the second content list screen 1200 (the number of content icons 1201$a$-1201$z$ shown in FIG. 3).

Note that, as used herein, the term "correspond" with respect to two numbers does not necessarily mean that the two numbers are exactly the same. For example, the number of the content icons 1101$a$-1101$x$ selected using the cursor 1103$a$ in FIG. 2A is smaller than the number of four rows of content icons 1101 selected using the cursor 1103$b$ in FIG. 2B because the second half of the row starting from the content icon 1101$b$ is empty. Even in such a case, it can be said that, on the first content list screen 1100, the number of content icons 1101 which can be selected using the cursor 1103 corresponds to the number of content icons 1201 which can be displayed on the second content list screen 1200.

In the shown example, the number of content icons 1201 which can be selected using the cursor 1203 is one on the second content list screen 1200. In this case, when a predetermined operation (pressing a button, etc.) performed by the user through the controller 100 has been obtained on the second content list screen 1200, transition to a playback screen for content selected using the cursor 1203 is performed. In another example, a predetermined range of content icons 1201 can also be selected using the cursor 1203 on the second content list screen 1200. When a predetermined operation performed by the user has been selected, transition to a third content list screen (a smaller number of content icons having a still larger size are shown) may be performed.

(3. Operation Using Controller)

Figure 4:
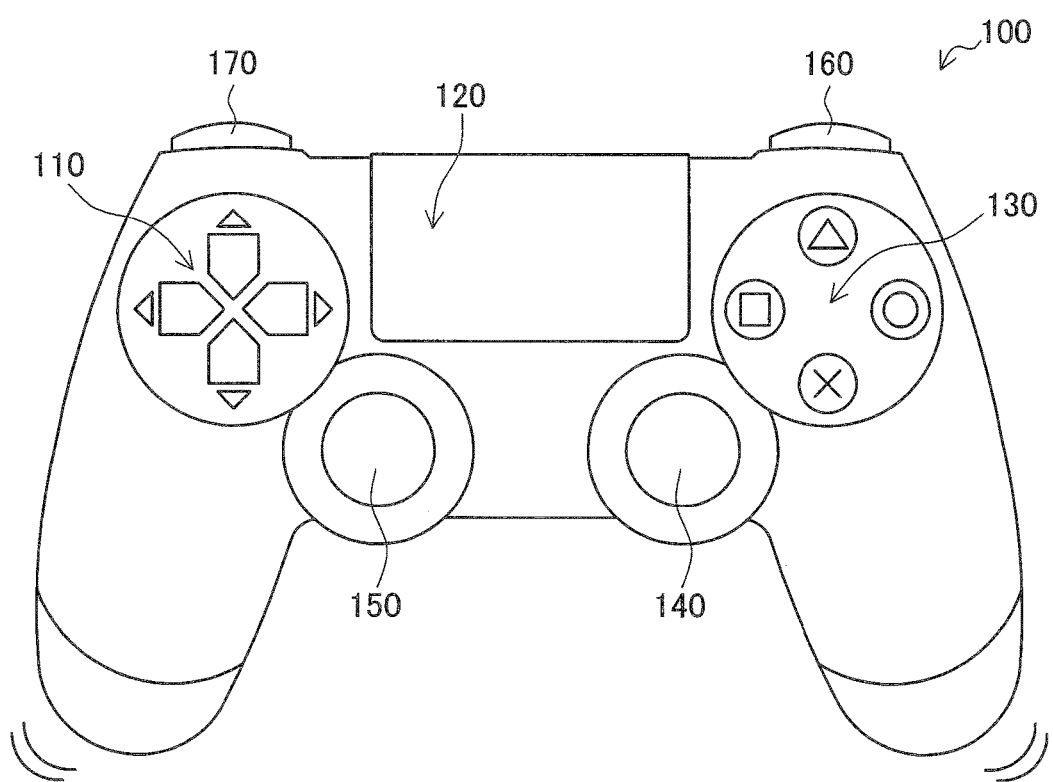
FIG. 4 is a diagram for describing an example operation which is performed using a controller in an embodiment of the present disclosure.

FIG. 4 is a diagram for describing an example operation which is performed using a controller in an embodiment of the present disclosure. As described above, in the system 10 according to this embodiment, the user's operation is obtained by the controller 100, and based on the obtained user's operation, the game apparatus base unit 200 provides a content list screen, content playback screen, etc. An example operation which is performed using the controller 100 will now be described in greater detail.

Referring to FIG. 4, the controller 100 includes, as operation units, a direction key 110, a touch pad 120, an operation key 130, a right stick 140, a left stick 150, a right button 160, and a left button 170. An operation signal which is generated by each operation unit being operated by the user is provided from the controller 100 to the game apparatus base unit 200, in which the control unit 220 obtains the user's operation based on the operation signal. In this case, for example, the control unit 220 assigns different operations of the user to all or a portion of the operation units on the content list screen and the content playback screen, and/or the plurality of content list screens described above. Some examples will now be described.

For example, on the playback screen for an image content, the right stick 140 is assigned the operation of zooming an image during playback, and the left stick 150 is assigned the operation of moving upward, downward, leftward, and rightward in an image. On the other hand, on the content list screen, as described below, different operation units are assigned different operations of the user.

On the first content list screen 1100 shown in FIGS. 2A and 2B, the direction key 110 is assigned the function of moving the cursor 1103 upward and downward, and the touch pad 120 is assigned the function of scrolling the content list screen 1100 by a flick operation and the function of changing the size of the cursor 1103 by a pinch/depinch operation. Note that the function of changing the size of the cursor 1103 will be described in detail below.

On the first content list screen 1100, the right stick 140 is assigned the function of scrolling the content list screen 1100 on a page-by-page basis. Alternatively, when, as in the example of FIGS. 2A and 2B, pieces of content are divided into groups according to month, etc., and arranged and displayed according to group, the right stick 140 may be assigned the function of scrolling the content list screen 1100 from head to head of the groups. Moreover, when the controller 100 includes a gyroscopic sensor (not shown), the right stick 140 may be assigned the function of freely moving the cursor 1103 based on the tilt of the controller which is detected by the gyroscopic sensor. The operation key 130 (circle button) and the right button 160 are assigned the operation of displaying the second content list screen 1200 for a content icon 1101 selected using the cursor 1103.

On the second content list screen 1200 of FIG. 3, the direction key 110 is assigned the function of moving the cursor 1203 upward, downward, leftward, and rightward, and the touch pad 120 is assigned the function of scrolling the content list screen 1200 by a flick operation. The right stick 140 is assigned the function of scrolling the content list screen 1100 on a page-by-page basis or scrolling the content list screen 1100 from head to head of the groups. When the controller 100 includes a gyroscopic sensor (not shown), the right stick 140 may be assigned the function of freely moving the cursor 1203 based on the tilt of the controller which is detected by the gyroscopic sensor. The operation key 130 (cross button) and the left button 170 are assigned the operation of returning to the first content list screen 1100.

(4. Changing of Selection Range of Cursor)

Figure 5A:
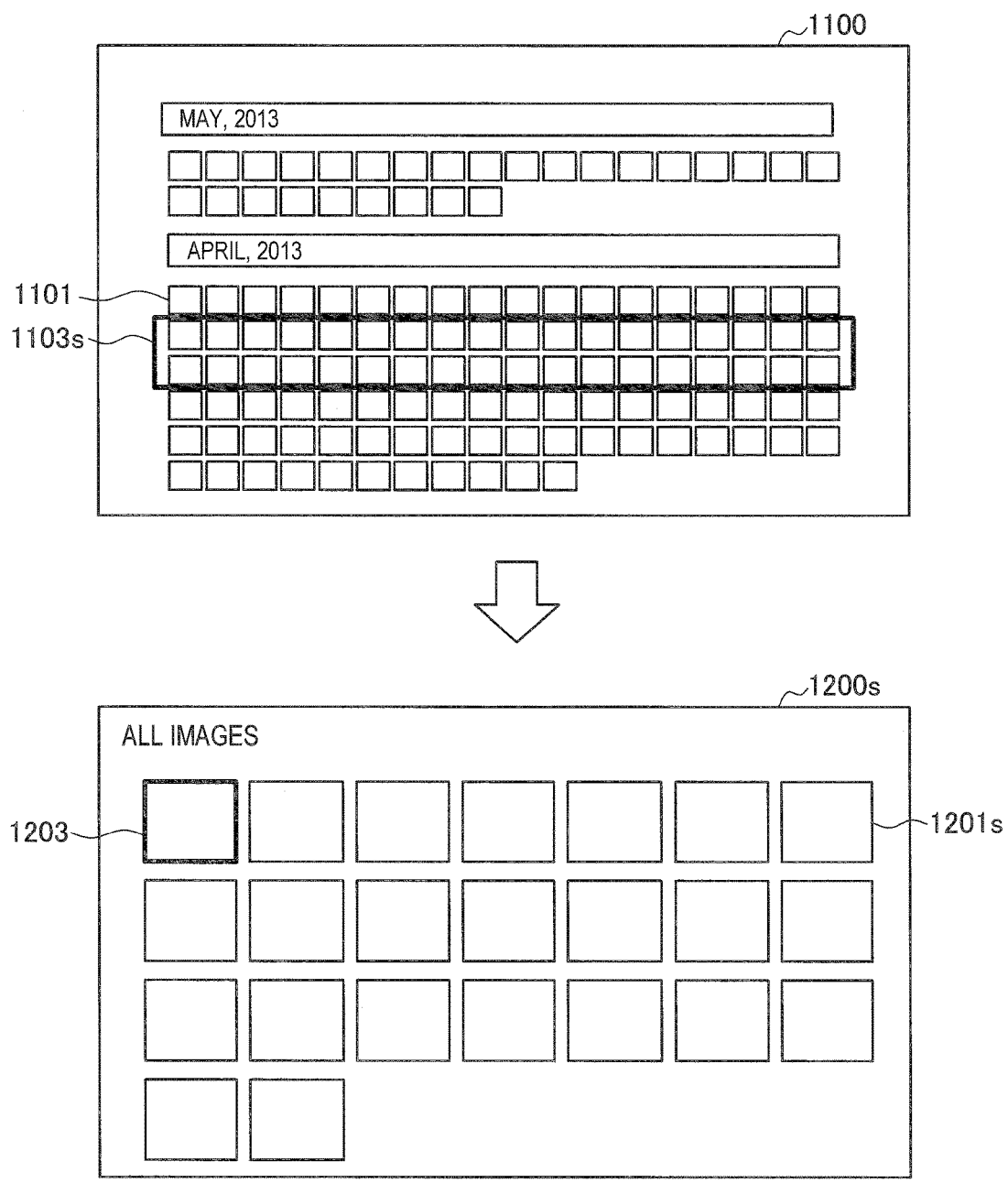
FIG. 5A is a diagram for describing changing of a selection range of a cursor in an embodiment of the present disclosure.
Figure 5B:
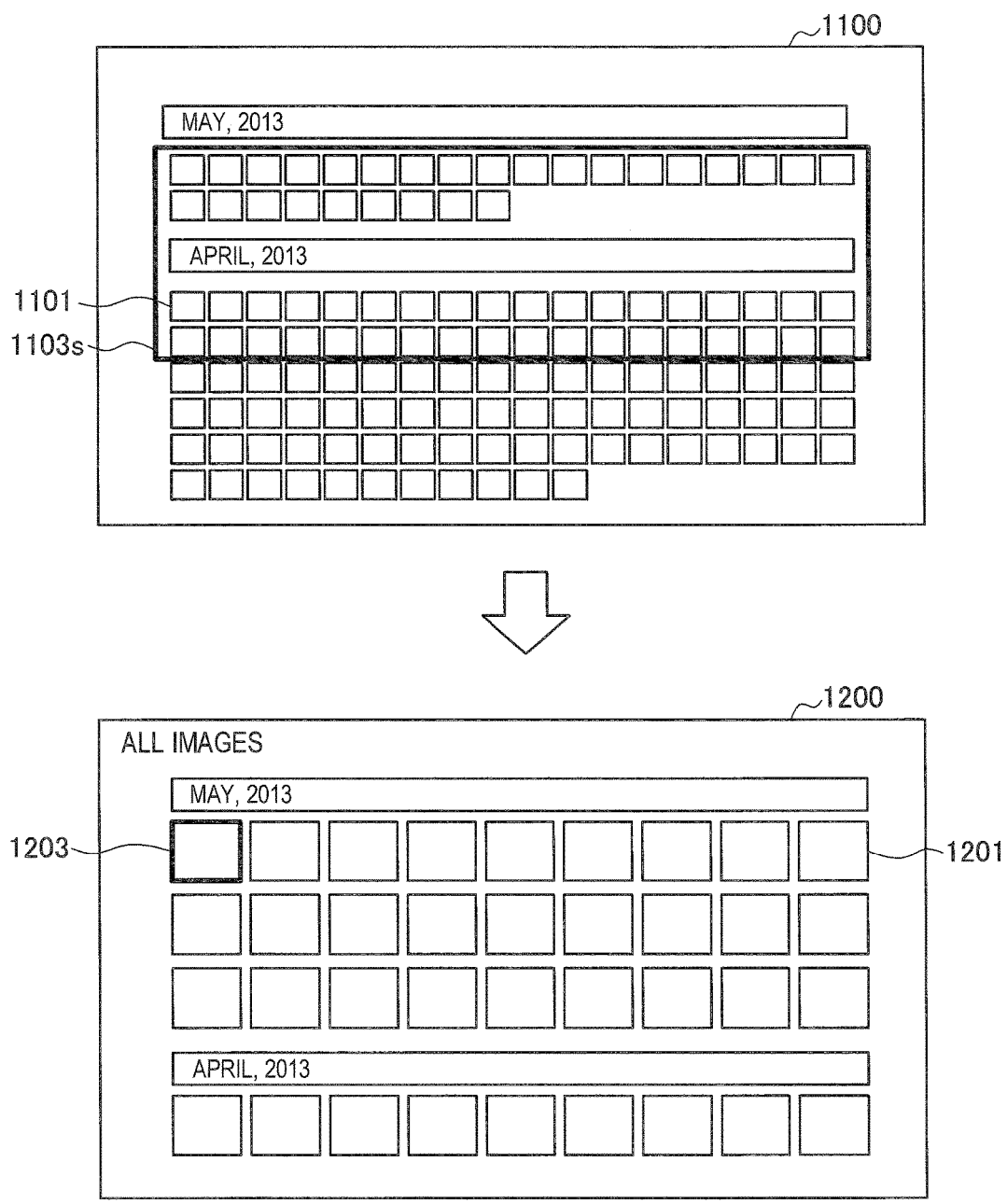
FIG. 5B is a diagram for describing changing of a selection range of a cursor in an embodiment of the present disclosure.
Figure 5C:
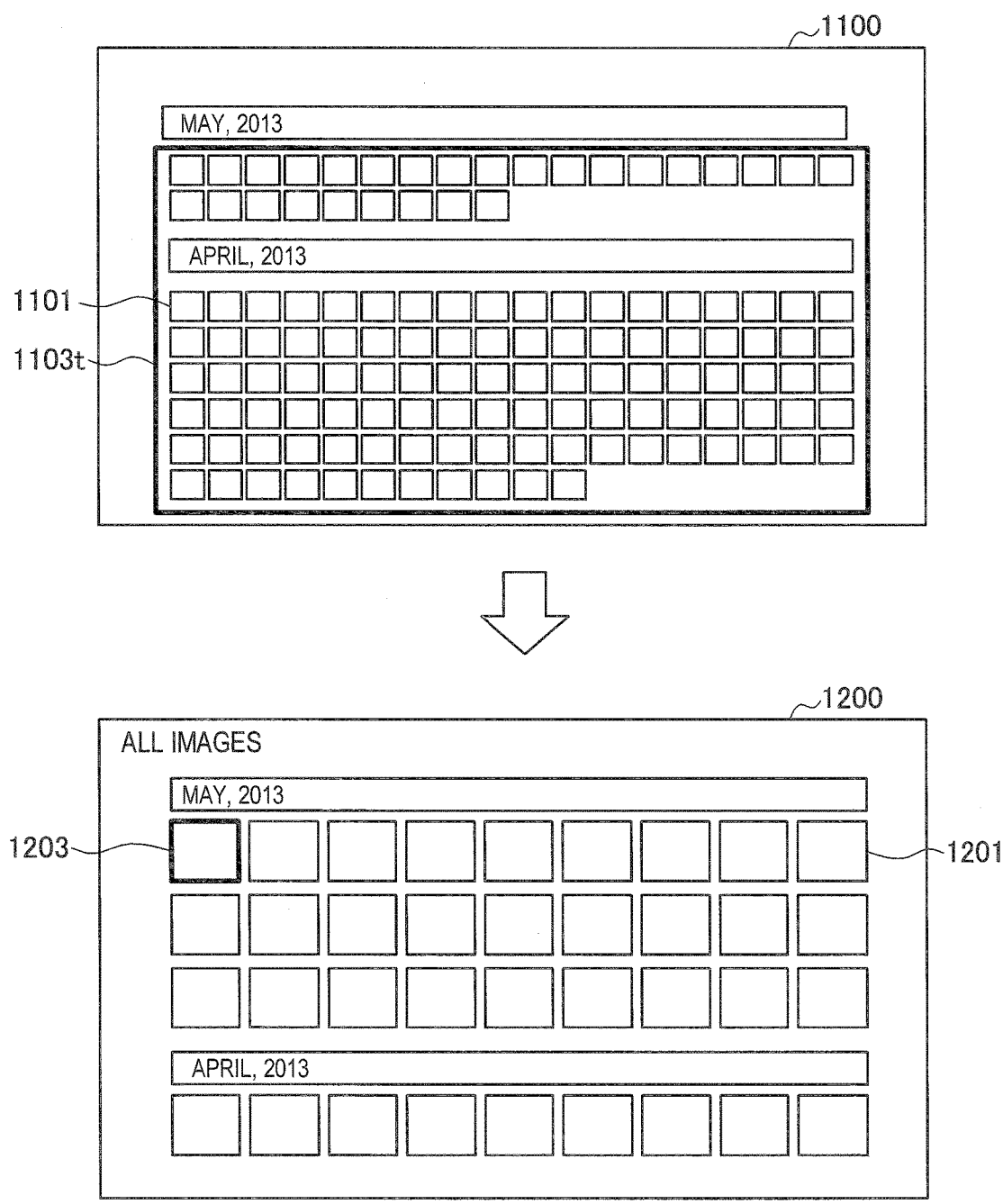
FIG. 5C is a diagram for describing changing of a selection range of a cursor in an embodiment of the present disclosure.

FIGS. 5A-5C are diagrams for describing changing of a selection range of a cursor in an embodiment of the present disclosure. In FIG. 5A, for example, the selection range of the cursor 1103 on the content list screen 1100 has been reduced by a pinch operation performed on the touch pad 120 of the controller 100. In FIG. 5B, the selection range of the cursor 1103 remains unchanged from the initial range (the same range as that shown in the examples of FIGS. 2A, 2B, and 3). In FIG. 5C, for example, the selection range of the cursor 1103 has been enlarged by a depinch operation performed on the touch pad 120 of the controller 100.

As described above, the number of content icons 1201 which can be displayed on the content list screen 1200 corresponds to the number of content icons 1101 which can be selected using the cursor 1103 on the content list screen

1100. Therefore, in the example of FIG. 5A-5C, in the case of FIG. 5B, exactly the same number of content icons 1201 as the number of content icons 1101 which can be selected using the cursor 1103 can be displayed on the content list screen 1200.

In contrast to this, in the case of FIG. 5A, the number of content icons 1101 which can be selected by a reduced cursor 1103s is smaller than the number of content icons 1201 which can be displayed on the original content list screen 1200. Therefore, in this case, the control unit 220 of the game apparatus base unit 200 may display a content list screen 1200s on which the size of each content icon 1201 (content icon 1201t) on the content list screen 1200 is increased, and content icons 1201s corresponding to the content icons 1101 selected using the cursor 1103s, whose sizes are increased to the extent possible, are arranged.

On the other hand, in the case of FIG. 5C, the number of content icons 1101 which can be selected using an enlarged cursor 1103t is smaller than the number of content icons 1201 which can be displayed on the original content list screen 1200. Therefore, in this case, the control unit 220 of the game apparatus base unit 200 may display a content list screen 1200 on which content icons 1201 corresponding to a portion of the content icons 1101 selected using the cursor 1103t, which are extracted based on a predetermined criterion, are arranged.

Note that, in the example of FIG. 5C, the sizes of the content icons 1201 may be reduced so that all the content icons 1101 selected using the cursor 1103t can be displayed. However, in the above example, the content list screen 1200 is used to view content icons 1201 which have an increased size compared to the content list screen 1100, and therefore, content icons 1201 to be displayed are extracted based on a predetermined criterion while the sizes of the content icons 1201 are not reduced.

(5. Extraction of Pieces of Content)

Figure 6:
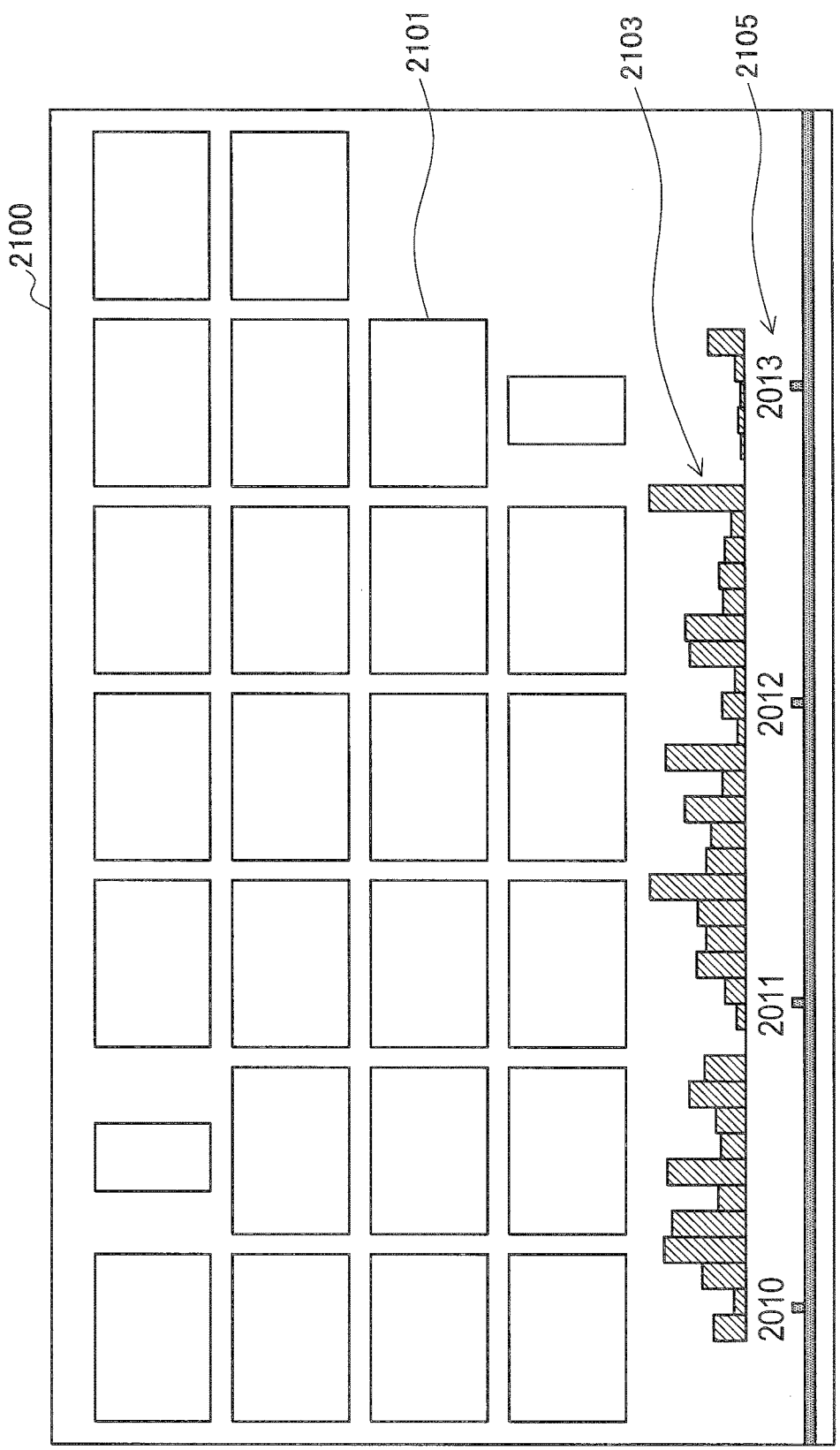
FIG. 6 is a diagram showing an example list screen which is displayed when pieces of content have been extracted in an embodiment of the present disclosure.

FIG. 6 shows an example list screen which is displayed when pieces of content have been extracted in an embodiment of the present disclosure. As described above, in this embodiment, for example, when the number of content icons selected using the cursor 1103 on the first content list screen 1100 exceeds the number of content icons which can be simultaneously displayed on the second content list screen 1200, some pieces of content are extracted from pieces of content (content group) indicated by the selected content icons based on a predetermined criterion, and content icons corresponding to the extracted pieces of content are displayed on the second content list screen 1200.

Note that, in addition to the above example, for example, the first content list screen 1100 may display content icons corresponding to pieces of content extracted from the content group. An example extraction of pieces of content described below is applicable to any screen that displays content icons corresponding to pieces of content extracted from the content group, in addition to the above first and second content list screens 1100 and 1200.

Referring to FIG. 6, a content list screen 2100 displays content icons 2101, a histogram 2103, and a time scale 2105. The content list screen 2100 is, for example, displayed on the television 300 under the control of the control unit 220 of the game apparatus base unit 200. The elements of the screen will now be described in greater detail.

The content icons 2101 each indicate content. More specifically, for example, the content icons 2101 may each be a thumbnail which indicates an image content (a photograph, video, etc.), or an icon which indicates a song or document content. In the shown example, the content icons 2101 indicate images (pieces of content) extracted from images (content group) taken during four years, 2010-2013, based on a predetermined criterion, for example, thumbnails indicating the first images of groups of event clustering, images posted on social media, images in which the face of a person of high importance has been detected by image analysis, the first images of groups grouped according to file name, images having a large view count, priority images set as the user's favorites, and images with high priority indicated by other meta information. The content icons 2101 are arranged in chronological order along the time scale 2105 (item axis).

The histogram 2103 indicates the number of pieces of content during each period of time indicated by the time scale 2105, i.e., each of the periods of time during which pieces of image content indicated by the content icons 2101 were taken. Therefore, the histogram 2103 is a histogram on the time scale 2105. The number of pieces of content indicated by the histogram 2103 may be the number of all pieces of content irrespective of the number of pieces of content which are displayed as the content icons 2101. In other words, the displayed histogram 2103 may allow the user who views the content list screen 2100 to recognize the content icons 2101 indicating extracted pieces of content, and in addition, how many pieces of content including pieces of content which are included in the content group, but have not been extracted, exist during different periods of time, i.e., the distribution in time of pieces of content.

Note that, also in examples described below, content icons indicating extracted pieces of content and a scale corresponding to the content icons are displayed. Although, in the examples below, a histogram is not shown, a histogram similar to the histogram 2103 may be displayed together with a scale to allow the user to recognize how many pieces of content which have not been extracted exist, as in the above example of FIG. 6.

Figure 7C:
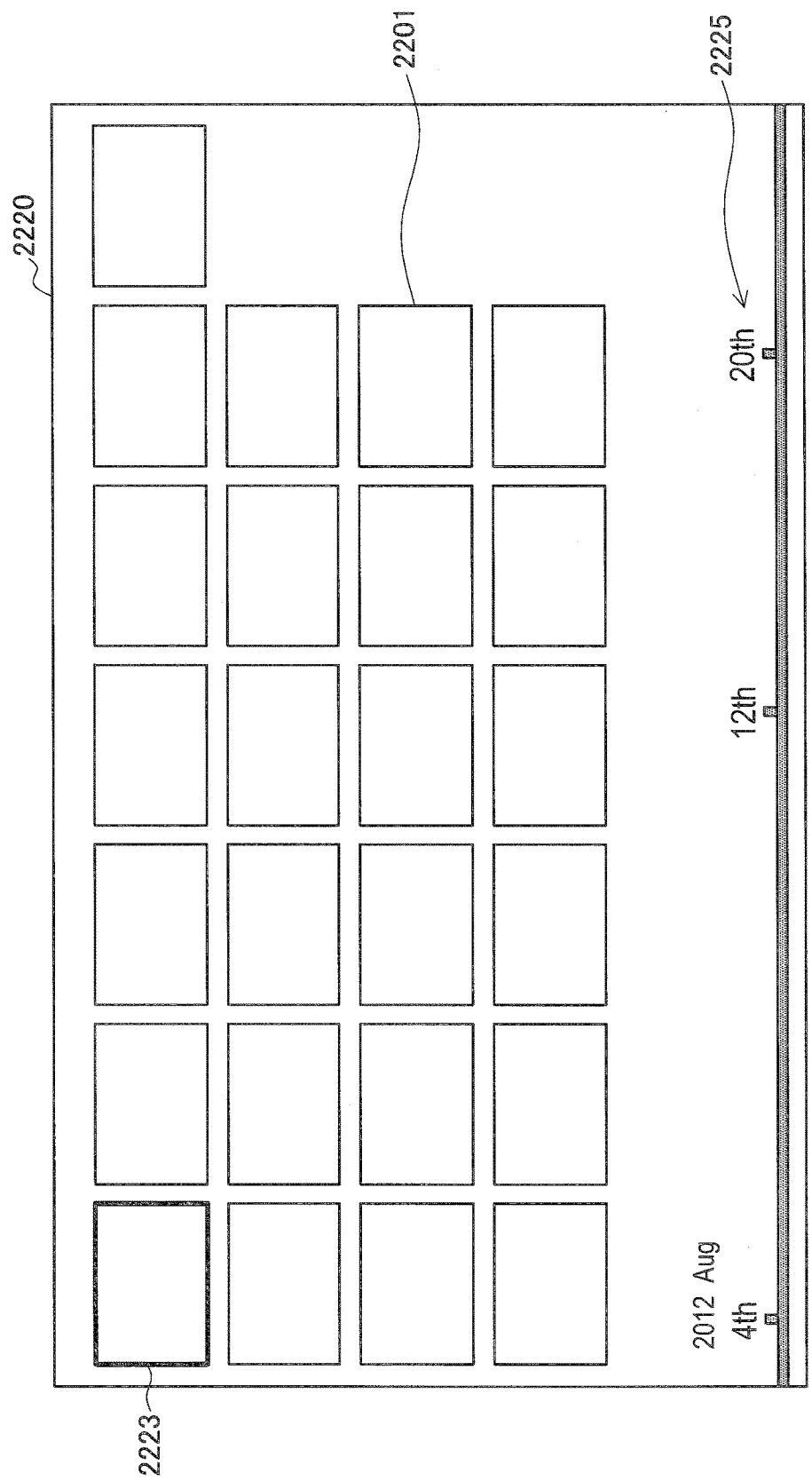
FIG. 7C is a diagram showing an example list screen on which the range of pieces of content to be extracted can be changed in an embodiment of the present disclosure.

FIGS. 7A-7C show example list screens on which the range of pieces of content to be extracted can be changed in an embodiment of the present disclosure. For example, when pieces of content are extracted based on a predetermined criterion as in the above example of FIG. 6, extracted pieces of content may vary depending on what range the pieces of content are extracted from. For example, if pieces of content are images which were taken during a predetermined period of time, extracted pieces of content vary depending on the length of the predetermined period of time. For example, when pieces of content are extracted from images which were taken during a long period of time, such as several years, etc., a larger number of images are removed without being extracted. On the other hand, when pieces of content are extracted from images which were taken during a short period of time, such as a few days, etc., only a small number of images are removed without being extracted.

On a content list screen 2200 shown in FIG. 7A, a time scale 2205 indicates four years, 2010-2013. Content icons 2201 are thumbnails indicating images which have been extracted from images which were taken during the four years based on a predetermined criterion, and are arranged along a time scale 2205 (item axis). A cursor 2203 can be used to select a predetermined range of content icons 2201, more specifically a column of content icons 2201. When a predetermined operation of the user (e.g., the operation of the operation key 130 (circle button) or the right button 160 in the example controller 100 of FIG. 4) has been obtained on the content list screen 2200, a period of time (a range on the item axis) corresponding to a range selected using the cursor 2203 at that time is scaled up to extract images again, so that a content list screen 2210 is displayed as shown in FIG. 7B.

Note that, at this time, any content icon 2201 may not necessarily be clearly selected using the cursor 2203. In other words, the range selected using the cursor 2203 is set in a field in which a plurality of content icons 2201 are arranged, irrespective of a location where the content icons 2201 are displayed. In the shown example, the cursor 2203 is located at a middle between two columns of content icons 2201. Even in such a case, a period of time corresponding to the location of the cursor 2203 can be specified, and therefore, transition to the content list screen 2210 can be performed.

Four months, July to October, are displayed by a time scale 2215 on the content list screen 2210 of FIG. 7B. Content icons 2201, which are thumbnails of images similar to those of the content list screen 2200 of FIG. 7A, are extracted from images which were taken during four months instead of four years, based on a predetermined criterion. The criterion for extraction may be similar to that of the content list screen 2200. Similarly, the cursor 2203 can be used to select a predetermined range of content icons 2201, more specifically one column of content icons 2201. On the content list screen 2210, when a predetermined operation of the user has been obtained, a period of time corresponding to the selection range of the cursor 2203 at that time is scaled up to extract images again, so that a content list screen 2220 is displayed as shown in FIG. 7C. Similar to the above example, any content icon 2201 may not necessarily be clearly selected using the cursor 2203.

One month, August 2012, is shown by a time scale 2225 on the content list screen 2220 of FIG. 7C. Content icons 2201, which are thumbnails of images similar to those of the content list screens 2200 and 2210 of FIGS. 7A and 7B, are extracted from images which were taken during one month, based on a predetermined criterion. The criterion for extraction may be similar to those of the content list screens 2200 and 2210. In the shown example, the content list screen 2220 has the shortest extraction period, and therefore, a cursor 2223 is used to select a single content icon 2201 unlike the content list screens 2200 and 2210. On the content list screen 2220, when a predetermined operation of the user has been obtained, a content playback screen is displayed for an image which has been selected using the cursor 2223 at that time.

(6. Display of Content Category)

FIG. 8 is a diagram showing a first example content category display in an embodiment of the present disclosure. In this embodiment, for example, a screen for displaying a list of content icons is provided, which is similar to the first content list screen 1100 or the second content list screen 1200, or the content list screen 2100, 2200, 2210, or 2220. In such a case, if pieces of content are divided into categories based on a predetermined criterion and are arranged and displayed according to category, it is advantageously easier for the user to search the pieces of content, for example.

An example of such a content category display will now be described. Note that, on the content list screen in this embodiment above, content icons may not necessarily be categorized or displayed in a manner described below. Content icons may, for example, be arranged in chronological order or in order of file name, etc. The category display described below is not limited to the above example content list screens, and is applicable to any screen that displays a list of content icons.

Referring to FIG. 8, a content list screen 3100 displays content icons 3101, a cursor 3103, a time scale 3105, and face images 3107. The content list screen 3100 is, for example, displayed on the television 300 under the control of the control unit 220 of the game apparatus base unit 200. The elements of the screen will now be described in greater detail.

The content icons 3101 each indicate content. More specifically, for example, the content icons 3101 may each be a thumbnail which indicates an image content (a photograph, video, etc.), or an icon which indicates a song or document content. In the shown example, the content icons 3101 are thumbnails indicating images which are extracted from images which were taken during four years, 2010-2013, based on a predetermined criterion (the content icons 3101 may be similar to those of the example described with reference to FIG. 6).

Here, the content icons 3101 are arranged in the horizontal direction along the time scale 3105 according to the time stamp of generation or updating of an image content, and are also arranged in the vertical direction according to the person indicated by the face image 3107. More specifically, content icons 3101a displayed in an upper portion of the content list screen 3100 each indicate an image including a person (boy) as a subject indicated by a face image 3107a. On the other hand, content icons 3101b displayed in a lower portion of the content list screen 3100 each indicate an image including a person (girl) as a subject indicated by a face image 3107b. Note that, for example, a person included in an image is identified by a process, such as facial recognition, etc., and is recorded as metadata of the image. It can be said that a time stamp represented by the time scale 3105 is a first attribute of an image content, and a subject indicated by the face image 3107 is a second attribute of an image content.

By the above category display of the content icons 3101, it is recognized that images of the person (boy) indicated by the face image 3107a were taken in the year 2012 and thereafter. For example, such a display allows the user to recognize the year a child was born, the year the user got to know their friend, etc., based on the arrangement of the content icons 3101.

A range is selected using the cursor 3103 on the content list screen 3100 on which the content icons 3101 are arranged. Here, for example, as in the case of a cursor 3103a shown in FIG. 8, the cursor 3103 may be used to select a range (rows) of content icons 3101 which extends across the vertical direction (a direction in which icons are arranged according to subject). In this case, images including the same person (in the shown example, the person indicated by the face image 3107b) can be selected. Alternatively, as in the case of a cursor 3103b shown in FIG. 8, the cursor 3103 may be used to select a range (column) of content icons 3101 which extends across the horizontal direction (a direction in which icons are arranged in chronological order). In this case, images which were taken during the same period of time (in the shown example, the second half of 2012) can be selected irrespective of persons included in the images. The cursor 3103a for selecting a row of content icons 3101 and the cursor 3103b for selecting a column of content icons 3101 may, for example, be switched by the user's operation.

FIG. 9 is a diagram showing a second example content category display in an embodiment of the present disclosure. Referring to FIG. 9, a content list screen 3200 displays content icons 3201, a time scale 3205, and place name labels 3207. The content list screen 3200 is, for example, displayed on the television 300 under the control of the control unit 220 of the game apparatus base unit 200. The elements of the screen will now be described in greater detail. Although not shown, a cursor similar to the cursor 3103 of FIG. 8 may be displayed on the content list screen 3200.

The content icons 3201 each indicate content, as with the content icons 3101 of FIG. 8, for example. Here, the content icons 3201 are arranged in the horizontal direction along the time scale 3205, and are also arranged in the vertical direction according to the shooting location indicated by the place name label 3107. More specifically, content icons 3201a displayed in an upper portion of the content list screen 3200 each indicate an image which was taken at a shooting location (Okinawa) indicated by a place name label 3207a. On the other hand, content icons 3201b displayed in a lower portion of the content list screen 3200 each indicate an image which was taken at a shooting location (Tokyo) indicated by a place name label 3207b. Note that, for example, the shooting location of an image is identified by a GPS sensor included in an image capture apparatus, such as a digital camera, etc., and is recorded as metadata of the image.

FIG. 10 is a diagram showing a third example content category display in an embodiment of the present disclosure. Referring to FIG. 10, a content list screen 3300 displays content icons 3301, a time scale 3305, and content type labels 3307. The content list screen 3300 is, for example, displayed on the television 300 under the control of the control unit 220 of the game apparatus base unit 200. The elements of the screen will now be described in greater detail. Although not shown, a cursor similar to the cursor 3103 of FIG. 8 may be displayed on the content list screen 3300.

The content icons 3301 each indicate content, as with the content icons 3101 of FIG. 8, for example. Here, the content icons 3301 are arranged in the horizontal direction along the time scale 3305, and are also arranged in the vertical direction according to the type indicated by the content type label 3307. More specifically, content icons 3301a displayed in an upper portion of the content list screen 3300 each indicate content of a type (photograph) indicated by a content type label 3307a. On the other hand, content icons 3301b displayed in a lower portion of the content list screen 3300 each indicate content of a type (video) indicated by a content type label 3307b.

For example, such a category display of the content icons 3301 allows the user to easily select pieces of content of a type which the user desires to view, such as photographs when the user desires to view photographs, videos when the user desires to view videos, etc.

FIG. 11 is a diagram showing a fourth example content category display in an embodiment of the present disclosure. Referring to FIG. 11, a content list screen 3400 displays content icons 3401, a time scale 3405, and storage labels 3407. The content list screen 3400 is, for example, displayed on the television 300 under the control of the control unit 220 of the game apparatus base unit 200. The elements of the screen will now be described in greater detail. Although not shown, a cursor similar to the cursor 3103 of FIG. 8 may be displayed on the content list screen 3400.

The content icons 3401 each indicate content, as with the content icons 3101 of FIG. 8, for example. Here, the content icons 3401 are arranged in the horizontal direction along the time scale 3405, and are also arranged in the vertical direction according to the storage as a place where content is stored (storage place), that is indicated by the storage label 3407. More specifically, content icons 3401a displayed in an upper portion of the content list screen 3400 each indicate content which is stored in a storage (NAS) indicated by a storage label 3407a. Content icons 3401b displayed in a middle portion of the content list screen 3400 each indicate content which is stored in a storage (online storage) indicated by a storage label 3407b. Content icons 3401c displayed in a lower portion of the content list screen 3400 each indicate content which is stored in a storage (camcorder) indicated by a storage label 3407c.

Such a category display of the content icons 3401 allows the user to easily recognize places where pieces of content are stored, and change places where pieces of content are stored when necessary.

Figure 12:
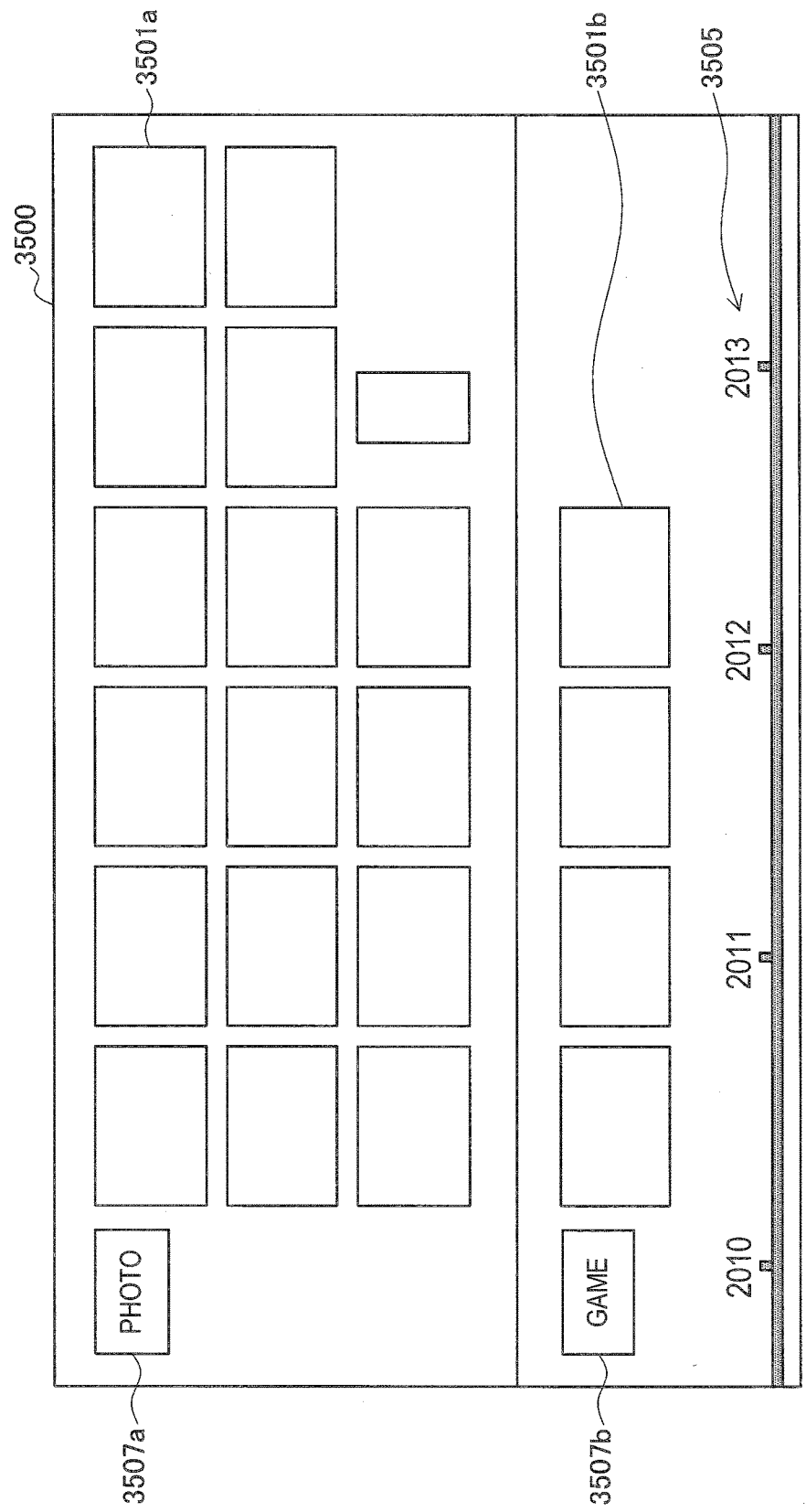
FIG. 12 is a diagram showing a fifth example content category display in an embodiment of the present disclosure.

FIG. 12 is a diagram showing a fifth example content category display in an embodiment of the present disclosure. Referring to FIG. 12, a content list screen 3500 displays content icons 3501, a time scale 3505, and category labels 3507. The content list screen 3500 is, for example, displayed on the television 300 under the control of the control unit 220 of the game apparatus base unit 200. The elements of the screen will now be described in greater detail. Although not shown, a cursor similar to the cursor 3103 of FIG. 8 may be displayed on the content list screen 3500.

The content icons 3501 each indicate content, as with the content icons 3101 of FIG. 8, for example. Here, the content icons 3501 are arranged in the horizontal direction along the time scale 3505, and are also arranged in the vertical direction according to the category indicated by the category label 3507. More specifically, content icons 3501a displayed in an upper portion of the content list screen 3500 each indicate content of a category (photographs taken) indicated by a category label 3507a. Content icons 3501b displayed in a lower portion of the content list screen 3500 each indicate content of a category (captures of game images) indicated by a category label 3507b.

For example, in the system 10 of FIG. 1, the game apparatus base unit 200 can be used to view photographs stored in the external storage 400, etc., and also capture a screen while playing a game. If there is a mix of images thus generated by different techniques, which are, for example, arranged together according to time stamp, etc., the user may be confused in some cases (in a case where there is a mix of photographs of children and captures of games for adults, etc.). By the above category display of the content icons 3501, images can be divided into categories and arranged and displayed according to category, and therefore, for example, the user's confusion described above can be reduced or prevented. Note that, in addition to the example of FIG. 12, various categories can be set. The user may be allowed to freely set categories.

In addition to the examples described above, there are a lot of examples in which advantages are obtained by dividing content icons into categories based on a plurality of criteria and arranging the content icons according to category. For example, when content icons are images linked to information about articles of commerce in an electronic commerce (EC) website, images linked to information about restaurants and bars, or thumbnails of posted videos, etc., then if one axis represents the popularity, access count, etc., of pieces of content while the other axis represents locations or other categories, the user can recognize that there are various pieces of content in addition to pieces of content which have simply a high popularity, high access count, etc. Note that when one axis represents something other than the popularity, access count, etc., of pieces of content, the other axis may not be particularly set, and content icons may be randomly arranged. Even in such a case, for example, the user can recognize that there are various pieces of content because content icons allow the user to know what the pieces of content are to some extent.

Note that, for example, when content icons are images linked to information about articles of commerce in an electronic commerce (EC) website, images linked to information about restaurants and bars, or thumbnails of posted videos, etc., a content list screen on which a list of content icons is displayed may, for example, be similar to the content list screens 1100 and 1200 described with reference to FIGS. 2A, 2B, 3, etc. Therefore, the configurations of the embodiments of the present disclosure which have been described as being applicable to the content list screens 1100 and 1200, etc., are also applicable to each of the above examples.

(7. Configuration of Hardware)

Figure 13:
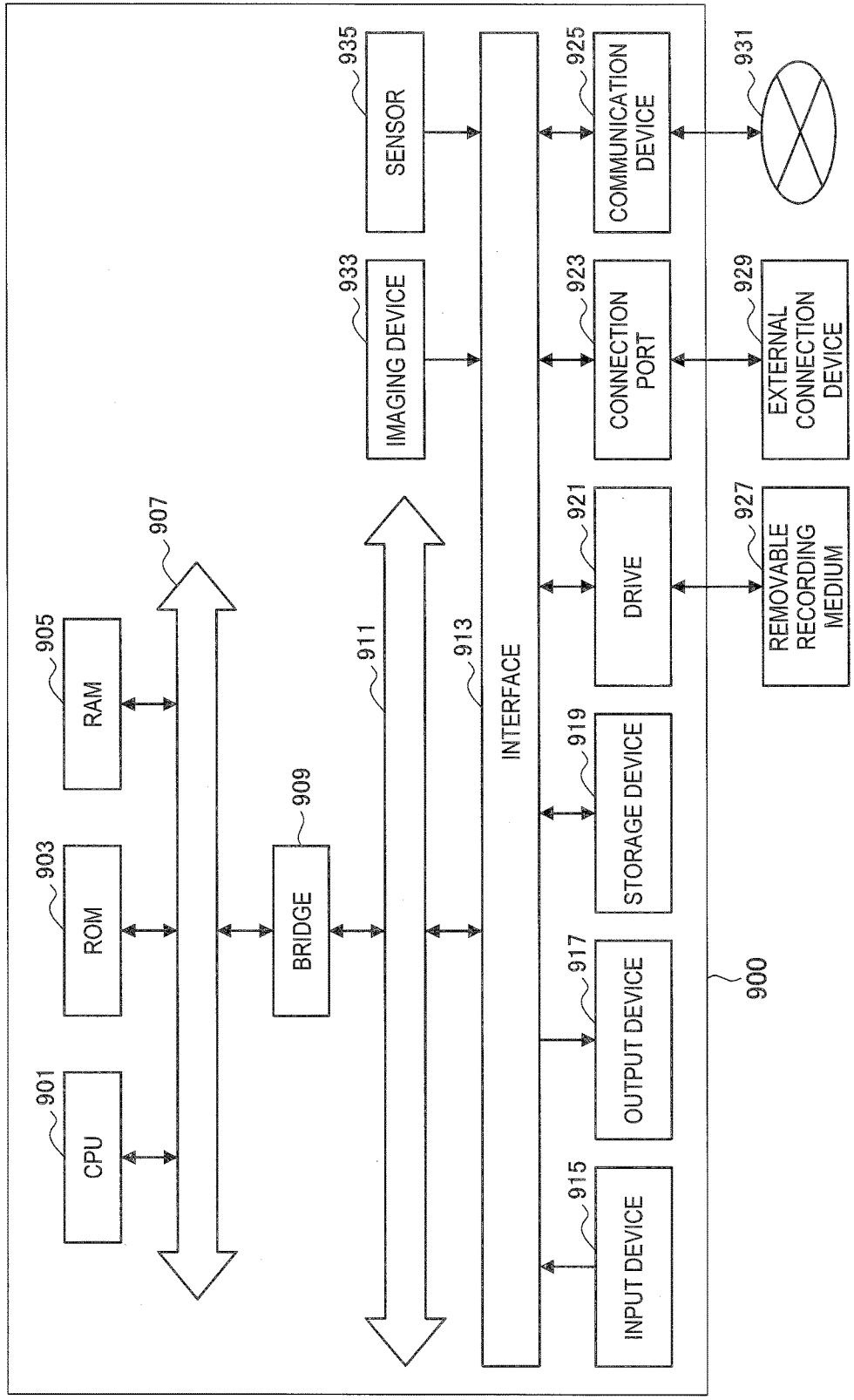
FIG. 13 is a block diagram showing an example hardware configuration of an information processing apparatus according to an embodiment of the present disclosure.

Next, a hardware configuration of an information processing apparatus according to an embodiment of the present disclosure will be described with reference to FIG. 13. FIG. 13 is a block diagram showing an example hardware configuration of an information processing apparatus according to an embodiment of the present disclosure. The information processing apparatus 900 shown may, for example, be used to implement the game apparatus base unit 200 of the above embodiment.

The information processing apparatus 900 includes a CPU (Central Processing Unit) 901, a ROM (Read Only Memory) 903, and a RAM (Random Access Memory) 905. In addition, the information processing apparatus 900 may include a host bus 907, a bridge 909, an external bus 911, an interface 913, an input device 915, an output device 917, a storage device 919, a drive 921, a connection port 923, and a communication device 925. Further, the information processing apparatus 900 may include an imaging device 933 and a sensor 935 as necessary. The information processing apparatus 900 may include a processing circuit such as a DSP (Digital Signal Processor) or ASIC (Application Specific Integrated Circuit), alternatively or in addition to the CPU 901.

The CPU 901 serves as an operation processor and a controller, and controls all or some operations in the information processing apparatus 900 in accordance with various programs recorded in the ROM 903, the RAM 905, the storage device 919 or a removable recording medium 927. The ROM 903 stores programs and operation parameters which are used by the CPU 901. The RAM 905 temporarily stores program which are used in the execution of the CPU 901 and parameters which are appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 is a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the information processing apparatus 900. Furthermore, the input device 915 includes an input control circuit which generates an input signal on the basis of the information which is input by a user and outputs the input signal to the CPU 901. By operating the input device 915, a user can input various types of data to the information processing apparatus 900 or issue instructions for causing the information processing apparatus 900 to perform a processing operation.

The output device 917 includes a device capable of visually or audibly notifying the user of acquired information. The output device 917 may include a display device such as an LCD (Liquid Crystal Display), a PDP (Plasma Display Panel), and an organic EL (Electro-Luminescence) displays, an audio output device such as a speaker or a headphone, and a peripheral device such as a printer. The output device 917 may output the results obtained from the process of the information processing apparatus 900 in a form of a video such as text or an image, and an audio such as voice or sound.

The storage device 919 is a device for data storage which is configured as an example of a storage unit of the information processing apparatus 900. The storage device 919 includes, for example, a magnetic storage device such as a HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the read information to the RAM 905. Further, the drive 921 writes in the removable recording medium 927 attached thereto.

The connection port 923 is a port used to directly connect devices to the information processing apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (High-Definition Multimedia Interface) port, and so on. The connection of the external connection device 929 to the connection port 923 makes it possible to exchange various data between the information processing apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the information processing apparatus 900, such as the orientation of the case of the information processing apparatus 900, as well as information regarding the environment surrounding the information processing apparatus 900, such as the brightness or noise surrounding the information processing apparatus 900, for example. The sensor 935 may also include a Global Positioning System (GPS) sensor that receives GPS signals and measures the latitude, longitude, and altitude of the apparatus.

The foregoing thus illustrates an exemplary hardware configuration of the information processing apparatus 900. Each of the above components may be realized using general-purpose members, but may also be realized in hardware specialized in the function of each component. Such a configuration may also be modified as appropriate according to the technological level at the time of the implementation.

(8. Supplements)

The embodiments of the present disclosure may, for example, encompass the above-described information processing apparatus and system, an information processing method which is executed in the information processing apparatus or system, a program for causing the information processing apparatus to function, and a non-transitory tangible medium storing the program.

Note that the information processing apparatus of the embodiment of the present disclosure is not limited to the game apparatus base unit 200 in the example which has been described above as an embodiment, and may, for example, include various apparatuses which can display a list of content icons based on the user's operation, such as various personal computers, tablets, televisions, recorders, etc. The information processing apparatus may not necessarily be limited to apparatuses to which a controller or a display device (e.g., a television, etc.) is externally connected, and may, for example, include an operation unit, such as an operation key, touch pad, etc., and/or a display.

Alternatively, the game apparatus base unit 200 or a terminal apparatus such as a personal computer or tablet may request a server through network communication to perform processing, and the server may function as the information processing apparatus of the embodiment of the present disclosure, alone or in cooperation with the terminal apparatus. In this case, the embodiment of the present disclosure includes a system including one or more information processing apparatuses which are used to implement the functions of the control unit 220 of the game apparatus base unit 200 described above.

Although the preferred embodiments of the present disclosure have been described in detail with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

The effects described in the specification are just explanatory or exemplary effects, and are not limiting. That is, the technology according to the present disclosure can exhibit other effects that are apparent to a person skilled in the art from the descriptions in the specification, along with the above effects or instead of the above effects.

Additionally, the present technology may also be configured as below.

(1) An information processing apparatus including:
a processor configured to perform the functions of
displaying a cursor configured to select a range of a list screen on which a plurality of icons are arranged, and
changing an icon or icons to be selected using the cursor based on an operation of a user while keeping unchanged the number of icons selectable using the cursor.

(2) The information processing apparatus according to (1), wherein
the list screen includes a first list screen configured to display a first number of icons, and a second list screen configured to display a second number of icons, the second list screen being displayed in response to a predetermined operation of a user performed on the first list screen, the second number being smaller than the first number, and
the second number of icons are selectable using the cursor on the first list screen.

(3) The information processing apparatus according to (2), wherein
a range selected using the cursor is changeable from an initial range based on an operation of a user,
the initial range on the first list screen includes the second number of icons,
when a range selected using the cursor on the first list screen is reduced from the initial range, a third list screen configured to display a third number of icons is displayed in response to the predetermined operation of a user, the third number being smaller than the second number, the icons on the third list screen being larger than the icons on the second list screen, and
when the range selected using the cursor on the first list screen is enlarged from the initial range, the second list screen displaying a second number of icons extracted from the icons selected using the cursor is displayed.

(4) The information processing apparatus according to (2) or (3), wherein
the processor further obtains an operation of a user based on an operation signal provided by a controller including a plurality of operation units, and assigns different operations of a user to all or a portion of the plurality of operation units on the first list screen and the second list screen.

(5) The information processing apparatus according to any one of (1) to (4), wherein
the plurality of icons are a plurality of content icons each indicating content, and the plurality of content icons each indicate content extracted from a content group, and
the processor is further configured to perform the function of displaying, on the list screen, the number of pieces of content including content included in the content group and not extracted from the content group.

(6) The information processing apparatus according to (5), wherein
the plurality of icons are arranged along an item axis, and the number of the pieces of content is displayed in a form of a histogram on the item axis.

(7) The information processing apparatus according to (1), wherein
the range selected using the cursor is set in a field in which the plurality of icons are arranged, irrespective of a location where the plurality of icons are displayed.

(8) The information processing apparatus according to (7), wherein the plurality of icons are a plurality of content icons each indicating content, and the plurality of content icons indicate pieces of content extracted from a content group and are arranged along an item axis, and the processor is further configured to perform the function of scaling up a range of the item axis corresponding to the range selected using the cursor based on a predetermined operation of a user, to extract the pieces of content again.

(9) The information processing apparatus according to (1), wherein the plurality of icons are a plurality of content icons indicating respective pieces of content, and on the list screen, the plurality of content icons are arranged in a first direction according to a first attribute of the pieces of content, and are arranged in a second direction different from the first direction according to a second attribute of the pieces of content different from the first attribute.

(10) The information processing apparatus according to (9), wherein the processor is further configured to perform the function of switching the range selected using the cursor between a range extending across the first direction and a range extending across the second direction.

(11) The information processing apparatus according to (9) or (10), wherein the first attribute includes time stamps of generation or updating of the pieces of content.

(12) The information processing apparatus according to any one of (9) to (11), wherein the pieces of content are pieces of image content, respectively, and the second attribute includes subjects or shooting locations of the pieces of image content.

(13) The information processing apparatus according to any one of (9) to (11), wherein the second attribute includes types, storage places, or categories of the pieces of content.

(14) A system including:

one or more information processing apparatuses configured to perform the functions of displaying a cursor configured to select a range of a list screen on which a plurality of icons are arranged, and changing an icon or icons to be selected using the cursor based on an operation of a user while keeping unchanged the number of icons selectable using the cursor.

(15) An information processing method including:

displaying a cursor configured to select a range of a list screen on which a plurality of icons are arranged; and changing an icon or icons to be selected using the cursor based on an operation of a user while keeping unchanged the number of icons selectable using the cursor.

(16) A program for causing a computer to execute the functions of:

displaying a cursor configured to select a range of a list screen on which a plurality of icons are arranged; and changing an icon or icons to be selected using the cursor based on an operation of a user while keeping unchanged the number of icons selectable using the cursor.

What is claimed is:

1. An information processing apparatus, comprising:
a processor configured to:
control to display a cursor configured to select a plurality of first icons from a first number of the first icons displayed on a first list screen,
wherein the first number is two or more;
control to display a second list screen comprising a second number of second icons,
wherein the second icons are extracted from the plurality of first icons selected by the cursor on the first list screen,
wherein the second number is equal to or smaller than the first number,
wherein a number of icons selectable by the cursor is changeable based on a first operation of a user, and
wherein a third number of icons are selectable by the cursor;
control to display a third list screen based on a reduction in the number of icons selectable by the cursor from the third number,
wherein the third list screen is configured to display a fourth number of icons,
wherein the fourth number is smaller than the third number, and
wherein size of icons on a fourth list screen is larger than size of icons on the first list screen, and
control to display the fourth list screen based on an increase in the number of icons selectable by the cursor from the third number,
wherein the fourth list screen is configured to display a fifth number of icons, and
wherein the fifth number of icons are extracted from icons selected by the cursor with the increase in the number of icons selectable by the cursor.

2. The information processing apparatus according to claim 1, further comprising:
a controller comprising a plurality of operation units,
wherein the processor is further configured to:
obtain a second operation of the user based on an operation signal of the controller; and
assign different user operations to each of the plurality of operation units,
wherein a first set of user operations assigned to each of the plurality of operation units on the first list screen differ from a second set of user operations assigned to each of the plurality of operation units on the second list screen.

3. The information processing apparatus according to claim 1,
wherein the first icons displayed on the first list screen are content icons,
wherein each of the content icons indicates content, wherein the content is extracted from a content group, and
wherein the processor is further configured to control to display a first number of pieces of content extracted from the content group and a second number of pieces of non-extracted content from the content group.

4. The information processing apparatus according to claim 3,
wherein the first icons are arranged along an item axis on the first list screen, and
wherein the first number of the pieces of content extracted from the content group is displayed as a histogram on the item axis.

5. The information processing apparatus according to claim 1, wherein the plurality of first icons are selected independent of a location where the plurality of first icons are displayed on the first list screen.

6. The information processing apparatus according to claim 1,
wherein the first icons displayed on the first list screen are content icons, wherein each of the content icons indicates content extracted from a content group,
wherein the content icons are arranged along an item axis on the first list screen, and
wherein the processor is further configured to:
scale up a range of the item axis based on a second operation of the user, wherein the range of the item axis corresponds to the number of icons selectable by the cursor; and
extract the content from the content group based on the scaled up range of the item axis.

7. The information processing apparatus according to claim 1,
wherein the first icons displayed on the first list screen are content icons,
wherein each of the content icons indicates content,
wherein on the first list screen, each of the content icons are arranged in one of a first direction or a second direction different from the first direction,
wherein the content icons are arranged in the first direction based on a first attribute of the content,
wherein the content icons are arranged in the second direction based on a second attribute of the content, and
wherein the second attribute is different from the first attribute.

8. The information processing apparatus according to claim 7, wherein
the processor is further configured to switch between a first cursor configured to select a first set of content icons arranged in the first direction and a second cursor configured to select a second set of content icons arranged in the second direction.

9. The information processing apparatus according to claim 7, wherein
the first attribute includes one of a time stamp of generation of the content or a time stamp of update of the content.

10. The information processing apparatus according to claim 7,
wherein the content are image content, and
wherein the second attribute includes one of subjects in the image content or shooting locations of the image content.

11. The information processing apparatus according to claim 7, wherein
the second attribute includes one of types of the content, storage places of the content, or categories of the content.

12. A system, comprising:
at least one information processing apparatuses configured to:
control to display a cursor configured to select a plurality of first icons from a first number of the first icons displayed on a first list screen,
wherein the first number is two or more;
control to display a second list screen comprising a second number of second icons,
wherein the second icons are extracted from the plurality of first icons selected by the cursor on the first list screen,
wherein the second number is equal to or smaller than the first number,
wherein a number of icons selectable by the cursor is changeable based on an operation of a user, and
wherein a third number of icons are selectable by the cursor,
control to display a third list screen based on a reduction in the number of icons selectable by the cursor from the third number,
wherein the third list screen is configured to control to display a fourth number of icons,
wherein the fourth number is smaller than the third number, and
wherein size of icons on a fourth list screen is larger than size of icons on the first list screen, and
control to display the fourth list screen based on an increase in the number of icons selectable by the cursor from the third number,
wherein the fourth list screen is configured to display a fifth number of icons, and
wherein the fifth number of icons are extracted from icons selected by the cursor with the increase in the number of icons selectable by the cursor.

13. An information processing method, comprising:
displaying a cursor configured to select a plurality of first icons from a first number of the first icons displayed on a first list screen,
wherein the first number is two or more;
displaying a second list screen comprising a second number of second icons,
wherein the second icons are extracted from the plurality of first icons selected by the cursor on the first list screen,
wherein the second number is equal to or smaller than the first number,
wherein a number of icons selectable by the cursor is changeable based on an operation of a user, and
wherein a third number of icons are selectable by the cursor;
displaying a third list screen based on a reduction in the number of icons selectable by the cursor from the third number,
wherein the third list screen is configured to display a fourth number of icons,
wherein the fourth number is smaller than the third number, and
wherein size of icons on a fourth list screen is larger than size of icons on the first list screen, and
displaying the fourth list screen based on an increase in the number of icons selectable by the cursor from the third number,
wherein the fourth list screen is configured to display a fifth number of icons, and
wherein the fifth number of icons are extracted from icons selected by the cursor with the increase in the number of icons selectable by the cursor from the third number.

14. A non-transitory computer-readable medium having stored thereon computer-executable instructions for causing the computer to perform execute operations, the operations comprising:
displaying a cursor configured to select a plurality of first icons from a first number of the first icons displayed on a first list screen,
wherein the first number is two or more; and
displaying a second list screen comprising a second number of second icons,
wherein the second icons are extracted from the plurality of first icons selected by the cursor on the first list screen,
wherein the second number is equal to or smaller than the first number,
wherein a number of icons selectable by the cursor is changeable based on a first operation of a user, and wherein a third number of icons are selectable by the cursor;

displaying a third list screen based on a reduction in the third number of icons selectable by the cursor from the third number,
- wherein the third list screen is configured to display a fourth number of icons,
- wherein the fourth number is smaller than the third number, and
- wherein size of icons on a fourth list screen is larger than size of icons on the first list screen, and displaying the fourth list screen based on an increase in the third number of icons selectable by the cursor from the third number,
- wherein the fourth list screen is configured to display a fifth number of icons, and wherein the fifth number of icons are extracted from icons selected by the cursor with the increase in number of icons selectable by the cursor from the third number.

* * * * *